US008766984B2

(12) United States Patent
Mark et al.

(10) Patent No.: US 8,766,984 B2
(45) Date of Patent: Jul. 1, 2014

(54) GRAPHICS RENDERING METHODS FOR SATISFYING MINIMUM FRAME RATE REQUIREMENTS

(75) Inventors: John Liam Mark, San Diego, CA (US); Michael U. Schwartz, San Diego, CA (US); Sean S. Rogers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 12/859,938

(22) Filed: Aug. 20, 2010

(65) Prior Publication Data

US 2012/0044251 A1 Feb. 23, 2012

(51) Int. Cl.
*G06T 13/80* (2011.01)

(52) U.S. Cl.
USPC .......................................... 345/473; 345/428

(58) Field of Classification Search
None
See application file for complete search history.

(56) References Cited

U.S. PATENT DOCUMENTS

| | | | | |
|---|---|---|---|---|
| 6,072,498 | A * | 6/2000 | Brittain et al. ................. | 345/428 |
| 6,906,708 | B1 | 6/2005 | Katayama | |
| 2004/0202109 | A1 * | 10/2004 | Akiyama et al. .............. | 370/235 |
| 2005/0206658 | A1 * | 9/2005 | Fagans .......................... | 345/660 |
| 2006/0190808 | A1 * | 8/2006 | Balthaser .................. | 715/500.1 |
| 2010/0060629 | A1 * | 3/2010 | Rasmusson et al. .......... | 345/419 |

OTHER PUBLICATIONS

Funkhouser T A et al: "Adaptive Display Algorithm for Interactive Frame Rates During Visualization of Complex Virtual Environments", SIGGRAPH Conference Proceedings, XX, XX, Jan. 1, 1993, pp. 247-254, XP001008529.
International Search Report and Written Opinion—PCT/US2011/034112, International Search Authority—European Patent Office—Sep. 15, 2011.
Lattanzi E et al: "Java-based continuous browsing of remote maps from a wireless PDA: a feasibility study", Multimedia and Expo, 2002. ICME '02. Proceedings. 2002 IEEE Internatio Nal Conference on Lausanne, Switzerland Aug. 26-29, 2002, Piscataway, NJ, USA,IEEE, US, vol. 1, Aug. 26, 2002, pp. 761-764, XP010604480, ISBN: 978-0-7803-7304-4.
Schmalstieg D et al: "Demand-Driven Geometry Transmission for Distributed Virtual Environments", Computer Graphics Forum, Wiley-Blackwell Publishing Ltd, GB, vol. 15, No. 3, Aug. 26, 1996, pp. C421-C432, XP009025629, ISSN: 0167-7055, DOI: 10.1111/1467-8659.1530421.

\* cited by examiner

*Primary Examiner* — Kee M Tung
*Assistant Examiner* — Ryan D McCulley
(74) *Attorney, Agent, or Firm* — Nicholas A. Cole

(57) ABSTRACT

Methods and devices enable rendering of graphic images at a minimum frame rate even when processing resource limitations and rendering processing may not support the minimum frame rate presentation. While graphics are being rendered, a processor of a computing device may monitor the achieved frame rate. If the frame rate falls below a minimum threshold, the processor may note a current speed or rate of movement of the image and begin rendering less computationally complex graphic items. Rendering of less computationally complex items continues until the processor notes that the speed of rendered items is less than the noted speed. At this point, normal graphical rendering may be recommenced. The aspects may be applied to more than one type of less computationally complex item or rendering format. The various aspects may be applied to a wide variety of animations and moving graphics, as well as scrolling text, webpages, etc.

52 Claims, 13 Drawing Sheets

GRAPHICS RENDERING METHODS FOR SATISFYING MINIMUM FRAME RATE REQUIREMENTS

FIELD OF THE INVENTION

The present invention relates generally to computer user interface systems and more particularly to graphic rendering methods.

BACKGROUND

Mobile computing devices (e.g. cell phones, PDAs, and gaming devices) are very popular serving as personal organizers, storing documents, photographs, videos, and music, as well as serving as portals to the Internet and electronic mail. In order to fit within the small displays of such devices, documents (e.g., music files and contact lists) are typically displayed in a viewer that can be controlled by scrolling or panning functions. In order to view all or parts of a document image or parse through a list of digital files, software developers typically include scroll or panning functions within applications created for use on mobile devices.

SUMMARY

The various aspects include a method for implementing a display animation on a computing device including monitoring a rate of frames rendered during the display animation, rendering less computationally complex items when the monitored frame rate is determined to be below a minimum acceptable value, wherein the less computationally complex items can be rendered faster than normal items, storing a speed of the animation when the monitored frame rate is determined to be below the minimum acceptable value, and rendering normal items when a speed of the animation speed falls below the stored speed. The monitored frame rate may be determined in any of a variety of manners. For example, the frame rate may be based upon a number of frames rendered during a predefined preceding interval. In another example, the frame rate may be based upon a running average of achieved frame rates or a calculation of the frame rate that reflects a running average rate. The placeholder items may be defined as part of an application. Less computationally complex may include image objects that are of lower resolution, leave out graphic elements which are expensive to render, are of smaller size or less detail, and fixed image elements that can be recalled from memory or otherwise made less computationally complex to render. The display animation may be one of a rapid list scroll animation, a rapid scroll or pan of a webpage, a rapid scroll of a text document, a rapid scroll or pan of a portable document format (PDF) document, a rapid scroll of a PowerPoint presentation, and a rapid scroll or pan of photographic images.

A further aspect may include a method for implementing a display animation on a computing device that includes designating a first rendering format for rendering images at an initiation of the display animation, rendering images using the designated rendering format, monitoring a rate of frames rendered during the display animation, determining when the monitored frame rate falls below a minimum acceptable value, designating a second rendering format for rendering images when it is determined that the monitored frame rate falls below the minimum acceptable value, wherein the second rendering format requires less processing than the first rendering format, storing a first speed of the animation when it is determined that the monitored frame rate is determined to be below the minimum acceptable value, determining when a speed of the animation is less than the stored first speed, and designating the first rendering format when the current designated rendering format is the second rendering format and it is determined that the speed of the animation is less than the stored first speed. The method may further include designating a third rendering format for rendering images and storing a second speed of the animation when the currently designated rendering format is the second format and it is determined that the monitored frame rate falls below the minimum acceptable value, determining when a speed of the animation is less than the stored second speed, and designating the second rendering format when the current designated rendering format is the third rendering format and it is determined that the speed of the animation is less than the stored second speed. The method may further include designating a fourth rendering format for rendering images and storing a third speed of the animation when the currently designated rendering format is the third format and it is determined that the monitored frame rate falls below the minimum acceptable value, determining when a speed of the animation is less than the stored third speed, and designating the third rendering format when the current designated rendering format is the fourth rendering format and it is determined that the speed of the animation is less than the stored third speed. The first, second and third rendering formats may be defined as part of an application. The monitored frame rate may be based upon a number of frames rendered during a predefined preceding interval, or upon a running average frame rate. The display animation may be one of a rapid list scroll animation, a rapid scroll or pan of a webpage, a rapid scroll of a text document, a rapid scroll or pan of a portable document format (PDF) document, a rapid scroll of a PowerPoint presentation, and a rapid scroll or pan of photographic images, or generated by a game application.

A further aspect includes a computing device including a memory and a display coupled to a processor in which the processor is configured with processor executable instructions to perform operations of the methods described above. A further aspect includes a computing device including means for performing the operations of the methods described above. A further aspect includes a non-transitory processor-readable storage medium having stored thereon processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
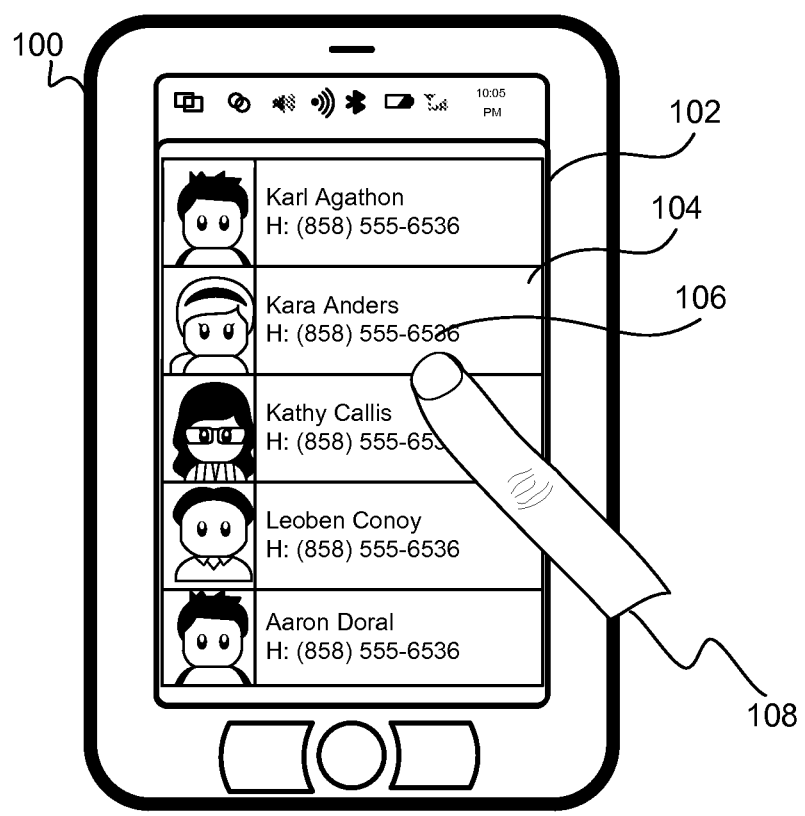
FIG. 1 is a frontal view of a portable computing device showing a list document on a touchscreen display.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" and "mobile device" refer to any one or all of cellular telephones, personal television receivers, personal data assistants (PDAs), palmtop computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices that include a programmable processor, memory, and a display. In an example aspect used to illustrate various aspects of the present invention, the computing device is a cellular telephone including an integral touchscreen display. However, this aspect is present merely as one example implementation of the various aspects, and as such is not intended to exclude other possible implementations of the subject matter recited in the claims.

As used herein, the term "list" may refer to any one of various data structures including an array, a linked list, a doubly linked list, or any similar data structure that can be logically presented as a sequential list, whether or not such data structure allows the list members to be accessed sequentially.

In the various aspects, methods and apparatus enable a computing device to render images of moving objects or images within a minimum frame rate requirement (e.g., 30 frames per second) even when processing resources cannot meet the minimum frame rate while rendering the objects or images in a normal format. In the various aspects, a processor of the computing device may monitor the frame rate achieved during the rendering of moving graphics or items. When the achieved frame rate drops below a minimum acceptable value (e.g., 30 frames per second), the processor may note the current speed of the rendered objects or items and begin rendering "lightweight" less computationally complex objects or items that replace the standard graphic objects or items in rendered images. Placeholder items are defined or selected so that they are quicker to render and quicker to create, which enables faster frame rates to be achieved in animation. Less computationally complex objects or items may include image objects that are of lower resolution, leave out graphic elements which are expensive to render, are of smaller size or less detail, and fixed image elements that can be recalled from memory or otherwise made less computationally complex to render. For ease of reference, such less computational complex image items are referred to herein as "placeholder" items. The rendering of such lightweight placeholder items may continue until the processor determines that the speed of the graphics items has decreased to the same speed (or less) at which the frame rate had dropped below the minimum acceptable value. When this condition is detected, the processor may begin requesting the rendering of normal (i.e., non-placeholder) objects or items. Because the placeholder items are selected to be less computationally complex so they require less processing to render (which is why they are referred to as "lightweight"), the processing resources are able to render the placeholder items at the minimum frame rate, while supporting the object or item movement rate (i.e., speed) required by the animation. An application used as an illustrative example herein is a rapid list scroll animation, such as may be generated in response to a user "flick" gesture on a computing device touchscreen display. The various aspects may be implemented with more than one type of lightweight placeholder items, enabling the rendered graphic quality to be optimized while supporting the minimum frame rate requirement.

While the various aspects are described below with reference to image items and list elements (e.g., a rapid list scroll animation), the aspects may also be applied to any displayed content or images which are scrolled or panned on a display. Examples of such other applications of the various aspects include scrolling or panning of webpage text and images, word processing documents, PDF documents, PowerPoint presentations, text documents, photographic images (e.g., JPEG and/or tagged image file format (TIFF) images), computer game graphics, etc.

An example implementation useful for describing the various aspects involves a rapid scroll of a list, such as may occur when a user performs a flick gesture on a contact list displayed on a mobile computing device (e.g., cellular telephone). Since an image of the entire contents of a document, such as a list of contacts, a word processing document, or picture image may not fit within the display area (as is typical in mobile computing devices), most graphical user interfaces (GUI) provide scrolling and panning functionality to enable the document image to be moved within the device view window. Users can press buttons or drag a finger across a touchscreen display to accomplish such scrolling and panning within the GUI. Typical document control gestures enabled in GUI systems on touchscreen computing devices include drag, pan, scroll, and "flick" gestures. In drag, pan, and scroll gestures, the displayed image moves relatively slowly following the touch location of the user's finger. However, in the flick gesture, the computing device moves the displayed document rapidly and for a distance determined based upon the user's touch gesture parameters (e.g., the measured speed of the flick).

An example of computing device receiving a flick gesture on a contact list is illustrated in FIG. 1. The mobile device 100 illustrated in FIG. 1 is equipped with a touchscreen display 102 on which is presented a contact list 104 made up of photographs and individual names and phone numbers. The GUI implemented on such a mobile device 100 will typically support a flick gesture functionality, in which the user applies a finger 108 to the touchscreen and moves it very rapidly in one direction, as indicated by the arrow 106, lifting the finger 108 from the display 102 at the end of the gesture as if flicking something off the surface.

Figure 3A:
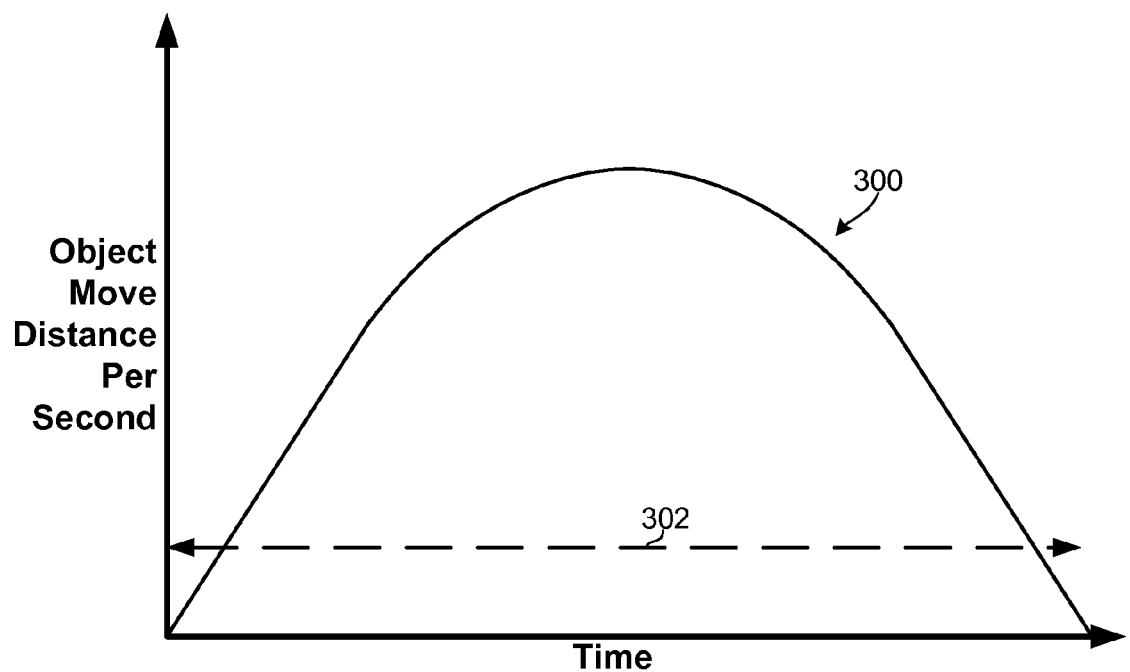
FIGS. 3A and 3B are graphs illustrating an example list scroll profile showing speed of movement (scrolling) as a function of time during a rapid scroll sequence.

Since flick gestures are standard GUI functions, many device and application developers prefer the gesture to provide consistent results. For example, in response to a particular speed of a flick gesture, the list scroll may be configured to scroll through a predetermined number of items (i.e., list entries) within a predetermined time. This ensures that users experience consistent results of their computing device (i.e., the same flick gesture should result in the list traveling the same distance in the same time), regardless of the processing capabilities of the device, current system loads, or the complexity of the items being rendered. Further, the movement of the list (or other graphic animation) will often be designed to exhibit a predefined movement behavior as a function of time. For example, many mobile device GUI systems and contact list applications are configured to exhibit a parabolic velocity profile such as illustrated in FIG. 3A. As is typical in many programmed animations, the duration of the animation, illustrated as arrow 302, is a predefined (i.e., constant) value so that the animation will always exhibit the same duration. In this manner, the list will appear to accelerate momentarily and then decelerate following a consistent speed versus time trajectory 300 before stopping at the final list location. Additionally, the amount of movement accomplished in the animation (which would be the area under the curve 300) is also fixed so that the moving objects or items come to a stop the same distance from the starting location regardless of processing capacity or complexity of the rendered images. Such predefined behavior may be implemented in the form of an algorithm or function that depends upon the duration of the animation (e.g., a time since the flick gesture was initiated).

Figure 2:
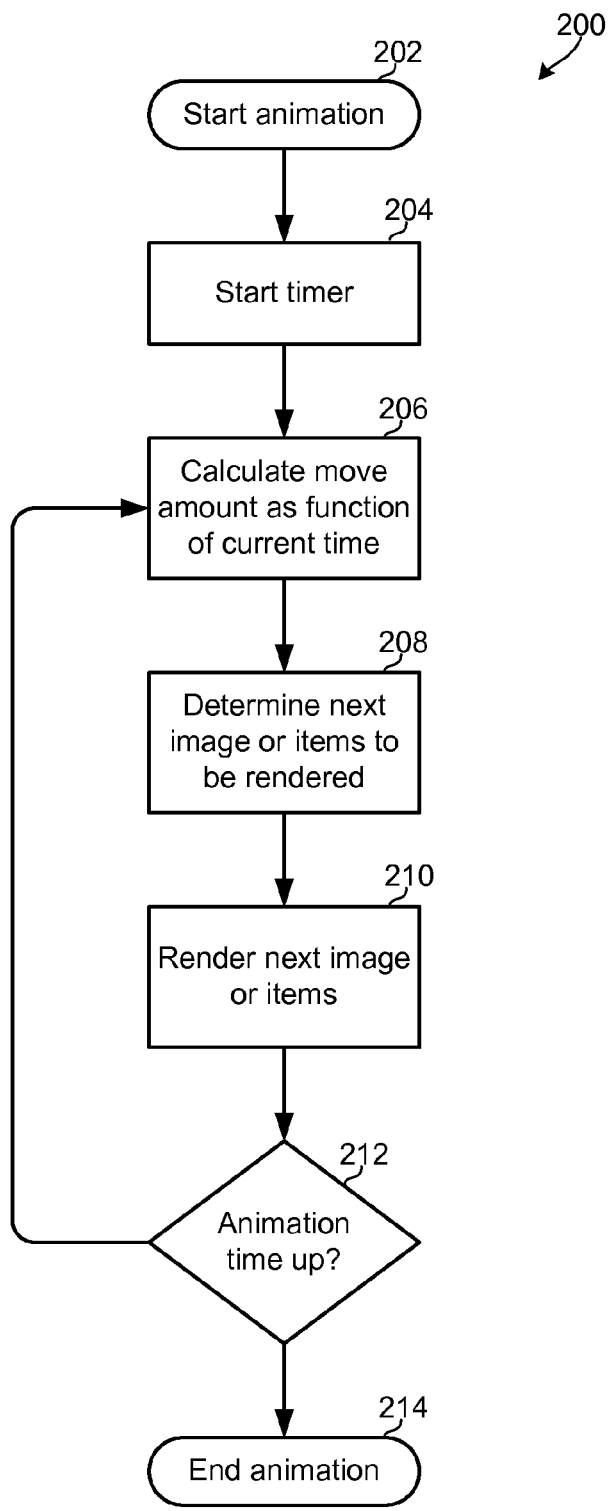
FIG. 2 is a process flow diagram of a prior art method for rendering a list of items in a computing device.

FIG. 2 shows an example of software operations 200 that may be implemented to generate a moving display according to a predefined speed versus time behavior. When an animation starts at block 202, a processor implementing the animation may start a timer in block 204 to provide a time reference for use in determining the appropriate movement behavior of the animation. In block 206, the processor may use the current time from the timer to calculate how far displayed objects or items should move in the next displayed frame (i.e., the next image presented on the display). For example, if the animation is a rapid list scroll, in block 206 the processor may determine how far each item in the displayed list will have moved as well as how many items are entering the display window at the top or bottom. In block 208, the processor may use the calculated amount of movement to determine the images or items to be rendered next. For example, the processor may use the movement amount to identify the items within the list that must be rendered in the next frame. In block 210, the processor may request the rendering of the next frame, such as by identifying to a rendering engine the objects are items to be rendered and their locations within the display area. In determination block 212, the processor may determine whether the animation has completed, and if not (i.e., determination block 212="No"), return to block 206 to calculate the movement amount as a function of the next instant in time. Once the animation has completed (i.e., determination block 212="Yes"), the animation sequence will end in block 214.

Figure 3B:
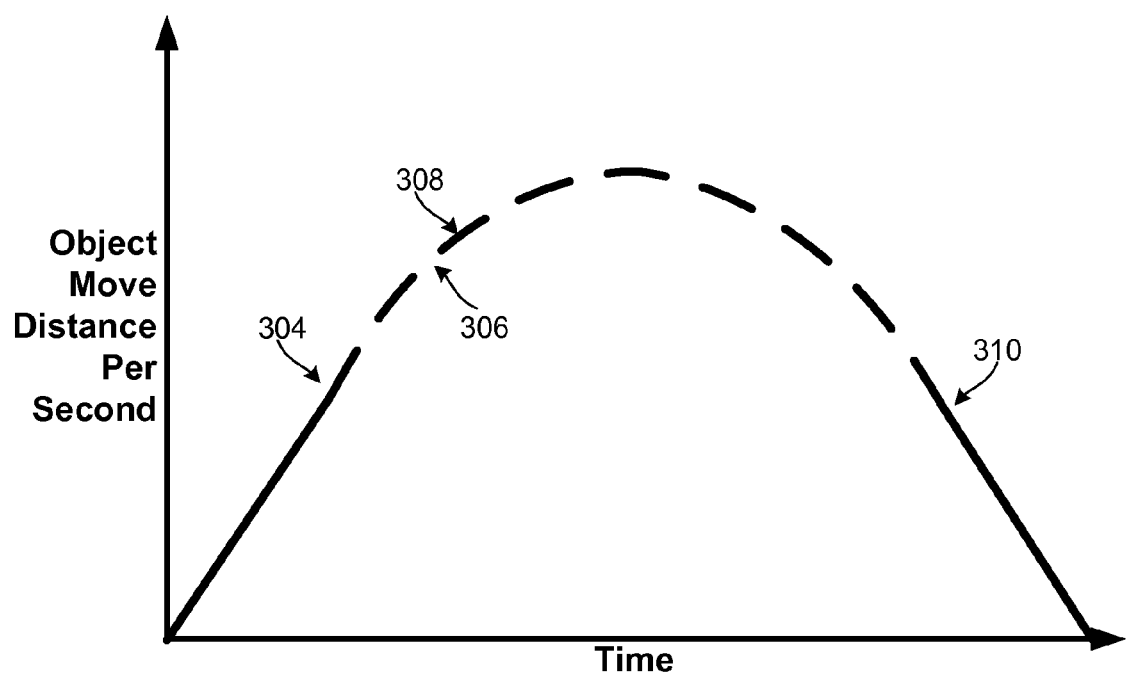

The faster that graphics move, such as a list of items scrolling, the more items need to be created and initialized per unit time. The creation, initialization, and rendering of the list items takes time. Faster moving graphics (e.g., a list scroll animation) require displaying more items per second, and therefore requires initializing more new image objects per unit time. Thus, the rendering of a frame for faster moving graphics (e.g., a list scroll animation) may take longer than for slowly moving graphics because there is more list item creation and initialization required. As a consequence, the achieved frame rate will drop. In some circumstances the creation and initialization of objects and images according to the method illustrated in FIG. 2 is unable to be accomplished fast enough to satisfy a minimum frame rate requirement. This may occur when the processing resources of the computing device are limited, as is often the case in mobile devices like cellular telephones, or when the objects or items are moving very rapidly, and/or the objects or items to be created, initialized, and rendered are computationally difficult (e.g., color photographs). When the achieved frame rate falls below a minimum frame rate requirement, the display may appear to flicker as image frames are dropped and the distance that objects move between rendered frames becomes large enough that they appear to jump or move in a jerky manner. This is illustrated in FIG. 3B which illustrates the creation, initialization, and rendering of objects as a function of time following the display behavior programmed into the animation illustrated in FIG. 3A. While the objects or items are moving relatively slowly in the animation, such as at the beginning of the animation, the processor may be able to create, initialize, and render the objects or items fast enough to achieve the desired minimum frame rate (e.g., 30 frames per second) as illustrated in the solid line 304. However, once the speed of the moving objects or items reaches a point where they can no longer be created, initialized, and rendered within the desired frame rate by the processing resources, the result may be a flickering display as some frames are dropped 306 while presented frame 308 may show the objects or items having moved a perceptible distance between frames. This degraded visual performance may continue until the object's or item's speed declines to a level at which the processor can again support the minimum frame rate, as illustrated in the solid line 310.

Such degradation of display performance may occur in mobile computing devices which often have limited computing power, and thus may be easily overwhelmed by the rendering of a rapidly moving list or other object. Such degraded performance may also occur in more capable computing devices, such as personal computers, if they are concurrently executing processor-intensive background operations such that the available processing resources are insufficient to keep up with the requested image rendering tasks while meeting the minimum frame rate requirement.

Application developers typically prefer to see frame rate performance that is equal to or greater than some minimum acceptable value, such as 30 frames per second. Historically, application developers work hard to avoid degraded visual performance of dropped frames or frame rates below the minimum acceptable value by extensive prototyping of animations. Such trial and error application development is time-consuming and expensive, and cannot take into account a variety of computing platforms, operating states and background processes which may impact the image rendering and animation behavior.

The various aspects resolve the problem of rapid graphic movements causing frame rates to drop below a minimum acceptable value in a manner that simplifies the application development process. In the various aspects the computing device is configured to substitute less computationally complex images or objects ("placeholders") that can be rendered quicker (or have implemented rendering formats that required less processing), thereby enabling the animation to satisfy the minimum acceptable frame rate requirement with controlled degradation in the displayed images. Since the processor monitors the achieved frame rate and implements the rendering of placeholder objects or items automatically, the application developer does not have to be concerned with the device's rendering performance, the rendering time of individual objects or items, or background processes executing on the target computing device. Instead, the application developer can specify within the application software the minimum desired frame rate and specify or provide the placeholder graphic items to be used when the rendering process cannot maintain the minimum frame rate with standard graphics or items.

Figure 4A:
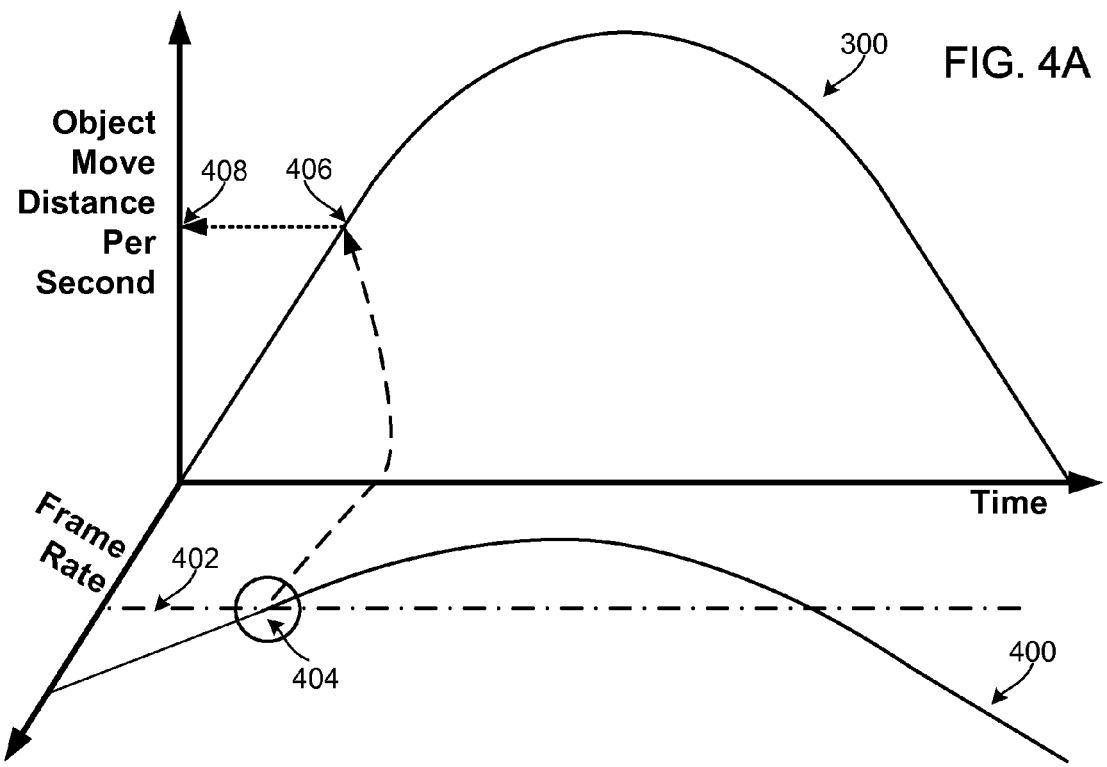
FIGS. 4A and 4B are three dimensional graphs illustrating an example list scroll animation profile on the Y axis and corresponding rendered frame rates on the Z axis versus time on the X axis.
Figure 4B:
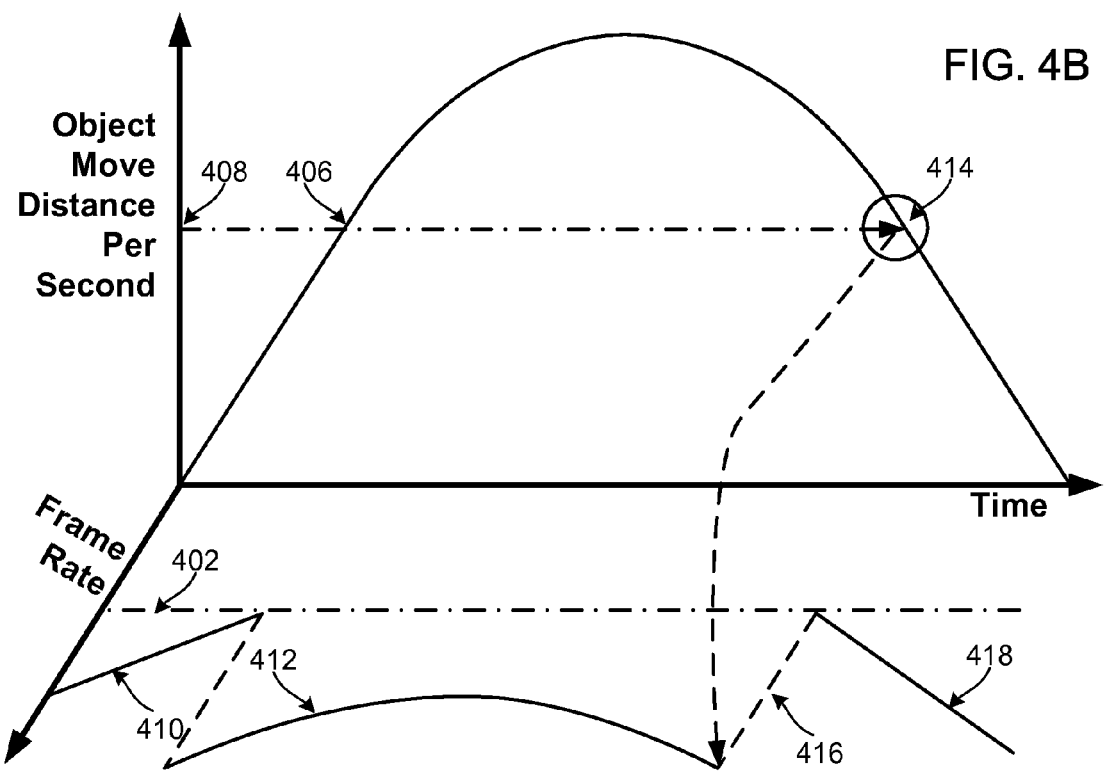

Operation of the various aspects is illustrated in FIGS. 4A and 4B, which are three-dimensional graphs illustrating both the pre-programmed object movement versus time profile 300 and achieved frame rates 400 as a function of time. Referring to FIG. 4A, in the example of a rapid list scroll in response to a flick gesture, the mobile device may be configured to follow a scroll speed versus time profile such as is illustrated in line 300. Due to processing resource limitations, the number of frames that can be generated, initiated, and rendered per second (i.e., the achieved frame rate) may vary as the speed of the list scroll increases over time. This is illustrated in line 400 which shows a declining frame rate as the speed of objects increases with time. Line 402 corresponds to a minimum desired frame rate, such as may be specified by a device manufacturer or application developer. In the various aspects, while the movement animation shown in line 300 is executed, the processor may keep track of the achieved frame rate and detect when the frame rate 400 drops below the minimum desired frame rate 402, such as is shown at point 404. When this condition is detected, the processor notes the object's or item's animation speed at that instant, such as indicated at point 406, and stores that speed or movement parameter 408 in memory. The processor also begins rendering placeholder items or objects, which are lighter weight (i.e., require less processing to generate their images), and thus can be rendered faster than the normal items in the animation.

Referring to FIG. 4B, the rendering of placeholder items enables the frame rate to increase above the minimum acceptable frame rate 402 even as the animation speed continues to increase. This is illustrated in the graph of the frame rate which shows the frame rate achieved rendering normal items declining in line segment 410 until the processor begins rendering placeholder items, at which point the frame rate increases above the minimum as shown in line segment 412. The processor then continues rendering placeholder items until it determines that the speed of the animation is less than or equal to the speed 408 at which the frame rate initially dropped below the minimum 402. This is illustrated as point 414. When the second condition is detected, the processor discontinues rendering of placeholder items, and switches back to rendering normal items. As indicated in dashed line 416, this may result in a decrease of the achieved frame rate to a rate equal to or greater than the minimum frame rate 402. As the animation decelerates towards its conclusion, the achieved frame rate shown in line segment 418 may increase. As is shown in FIG. 4B, the various aspects result in the achieved frame rate remaining above the minimum frame rate 402 (except perhaps momentarily). This consistent frame rate behavior is achieved by performing two simple comparisons to values readily available to the processor, namely comparing the achieved frame rate (which is a value that may be known to the processor already) to a minimum threshold, and comparing the animation speed to a value stored in memory.

Figure 5A:
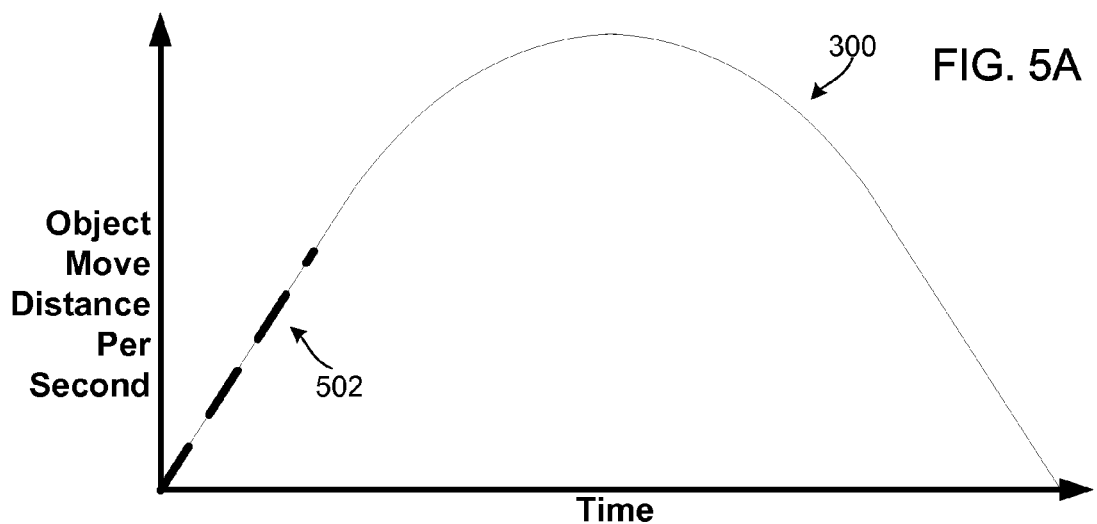
FIGS. 5A-5C are graphs illustrating how rendered items may be adjusted during a rapid scroll event according to the various aspects.
Figure 5B:
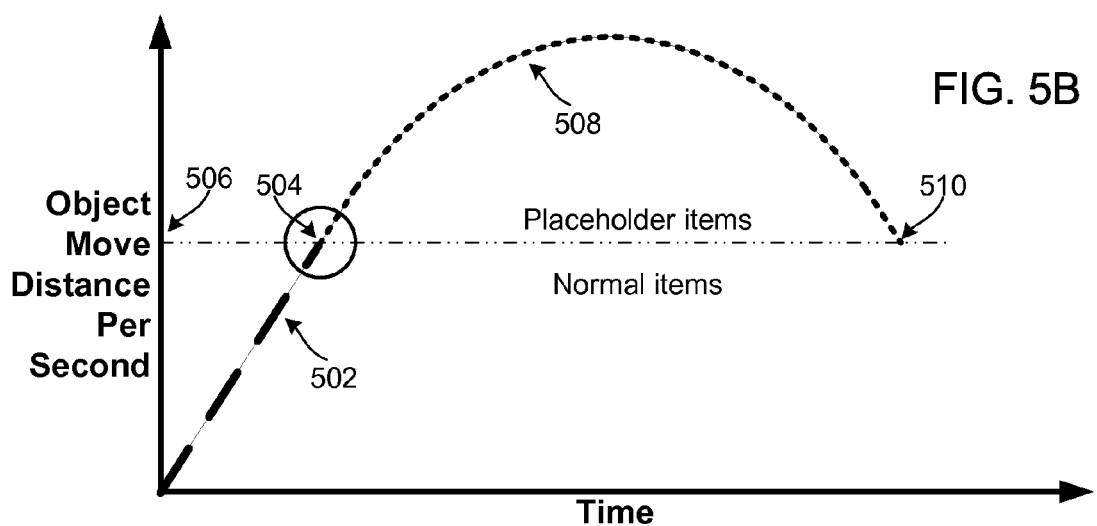
Figure 5C:
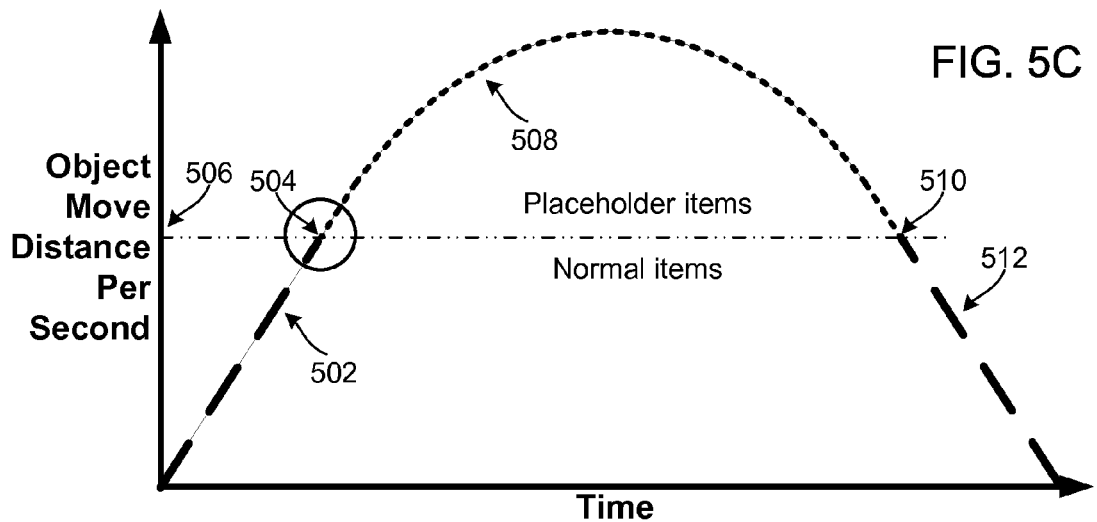

Operation of the various aspects in the example of a rapid list scroll animation 300 is illustrated further in FIGS. 5A-5C. Referring to FIG. 5A, at the beginning of a list scroll animation, the achieved frame rate of rendered list items remains above the minimum threshold as the list items speed (i.e., object distance per second) increases, so normal list items are rendered as shown in line 502. Referring to FIG. 5B, when the processor determines that the achieved frame rate is at or below the minimum value, which is determined at point 504, the processor stores the current list item speed 506 and begins rendering placeholder items as indicated by dashed line 508. The processor continues rendering placeholder items (line 508) until the list item speed is once again at or below the stored list item speed 506, as illustrated at point 510. Thereafter, the processor returns to rendering normal items as indicated by line 512 shown in FIG. 5C.

A wide variety of placeholder items may be implemented in the various aspects to enable a pleasing user visual experience. The nature of the placeholder items may depend upon the type of document being animated, as well as the type of animation. Further, as described below with reference to FIG. 10, the various aspects may be applied to general computer graphic animations, for which the placeholder item may be very general in nature, and may be defined by the application developer. Examples of placeholder items suitable for a list application are illustrated in FIGS. 6A-6D.

Figure 6A:
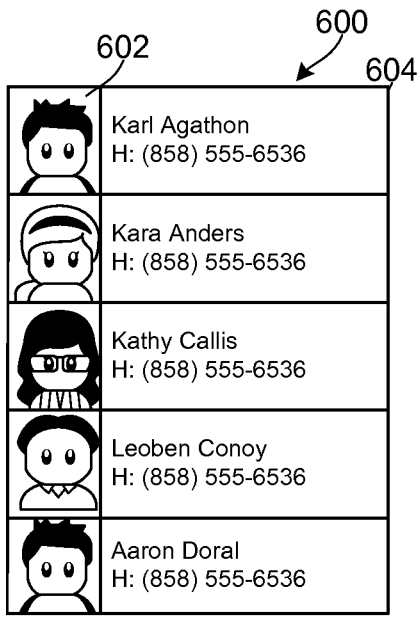
FIG. 6A is an illustration of an example list of items in a contact list.

Referring to FIG. 6A, an application including many data records, such as a contacts application for a cellular telephone, may organize data in the form of a list 600, which may include a variety of data elements, such as photographs 602 and text data 604. To scroll through such a list, users may press keys or execute touch gestures on a touchscreen display (e.g., as illustrated in FIG. 1) to cause the list to scroll. As the list scrolls, the application requires the processor to render all of the images within the visible portion of the list 600, including each of the images 602 and all of the text data at 604.

Figure 6B:
FIGS. 6B-6D are illustrations of example lightweight less computationally complex items that may be used in the various aspects to support the example list illustrated in FIG. 6A.

Referring to FIG. 6B, one form of placeholder items 610 that may be used in various aspects involves replacing the individual images 602 with a standard (i.e., non-varying) simple graphic 612. Such a standard simple graphic 612 may be much easier to render than photographs 602, enabling placeholder items including the text data 604 to be rendered at the minimum frame rate even as the list scrolls rapidly. Since the simple graphic 612 requires less processing to render than a variety of different photographs 602, the placeholder items shown in FIG. 6B are "lighter weight" than the normal items shown in FIG. 6A.

Figure 6C:

An even lighter weight example placeholder item is illustrated in FIG. 6C, in which photographs 602 are replaced with blank spaces 622. Since there is no need to render even a simple graphic 612, the placeholder items 620 shown in FIG. 6C may enable the list text data 604 to be included in the rendered images during a rapid scroll movement while still achieving the minimum frame rate.

Figure 6D:
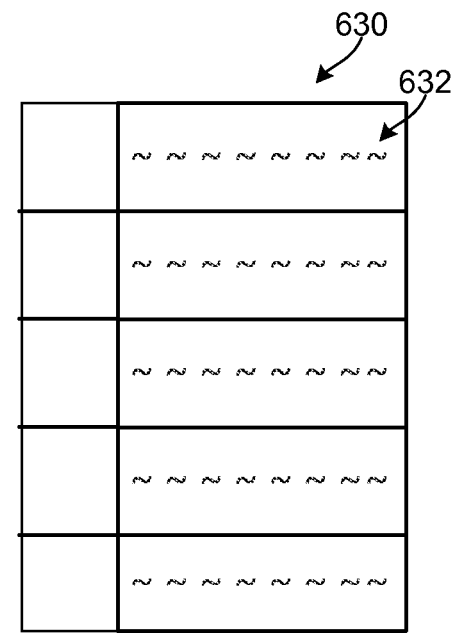

If the rapid scroll animation speed increases to a point at which even the text data 604 cannot be rendered in the animation without dropping below the minimum frame rate, an even lighter weight placeholder item may be used, such as illustrated in FIG. 6D. In this placeholder item 630, the text data is replaced with a standard graphic 632, so that the individual text data does not have to be rendered. Using a standard graphic 632 for list item data may enable the processor to render images simply by placing the same graphic image (which may be stored in a buffer) in different locations on the display to create the illusion of movement without the need for rendering specific items.

While the examples illustrated in FIGS. 6B through 6D appear to present significantly less data to the user, the presentation of these placeholder items occurs only during rapid animation. Thus, a user may not be aware that actual photographs 602 have been replaced with a standard graphic 612 as illustrated in FIG. 6B. At even higher speeds, the user may not be aware that photographs are not being displayed or may not mind that photographs are not presented as illustrated in FIG. 6C. At even higher speeds, the user may not be able to distinguish moving text from a text-like graphic, and so may not be aware that the text data 604 has been replaced by a graphic placeholder item 632 which is configured to appear like text went rapidly moving.

A variety of different kinds of placeholder items may be implemented, as may be defined by application developers. For example, in a list application (e.g., a contact list or phonebook application), light weight placeholder items may be provided by dropping some of the data from the rendered images. For example, in a contact list scroll animation, contact address and phone number data may be dropped from the rendered items so only the individuals' names appear in the placeholder items. In some implementations, dropping categories of information may result in the height of each list item while the list is scrolling fast, and the categories expanding or placeholder entities for the categories filling as the scroll speed reduces. Thus, the use of placeholders may affect the height of items in a scrolling list. As another example, shading, group identifiers, and other list item image enhancements may be dropped from the animated images to provide the light weight placeholder items. As a further example, placeholders may be reduced to headings or segment headers in a list, such as a display of the index letter of the current position of the list (e.g., A, B, C, etc.).

Figure 7:
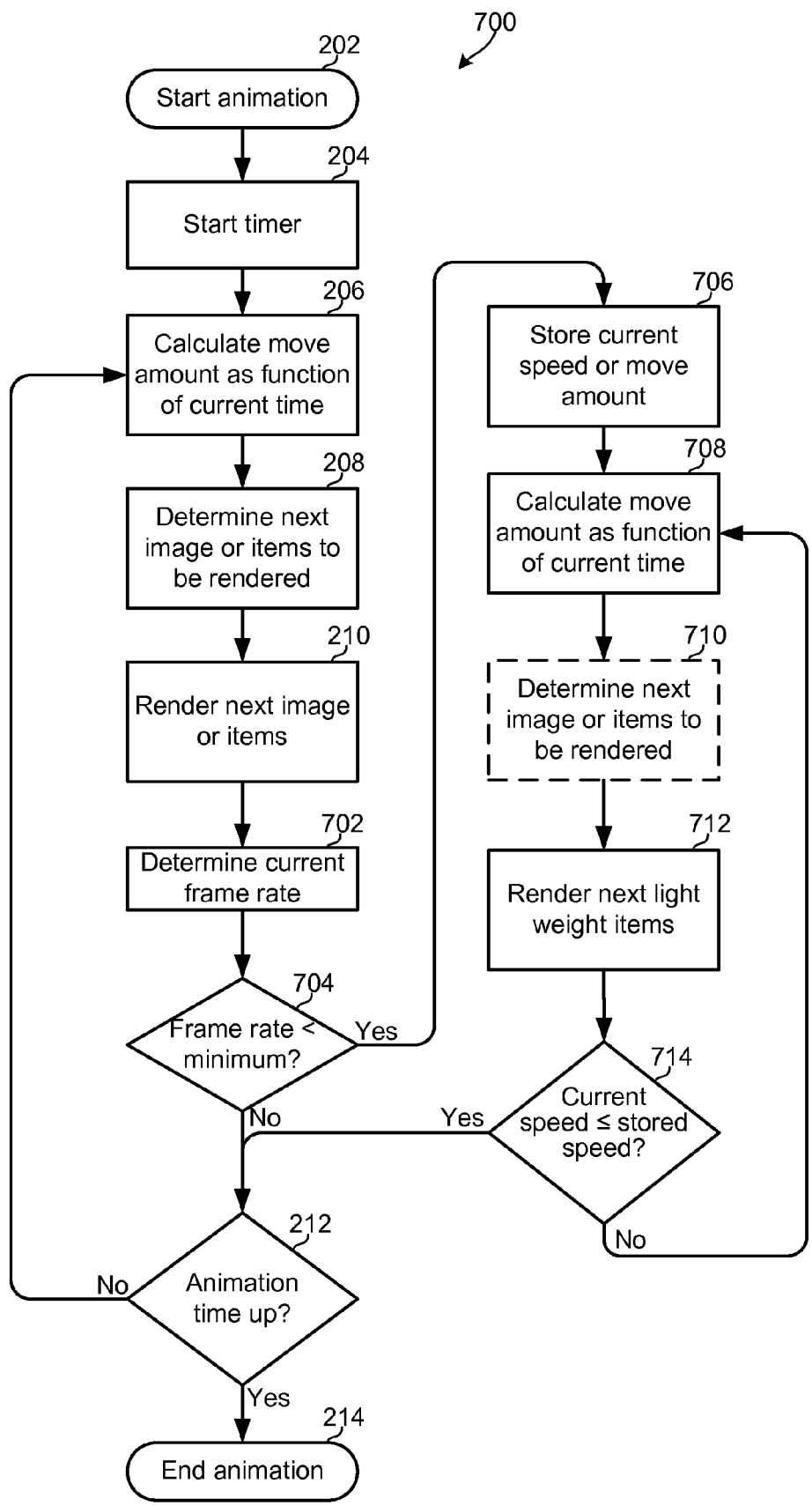
FIG. 7 is a process flow diagram of an aspect method for enabling a computing device to render a display animation with at least a minimum frame rate.

FIG. 7 illustrates an example method 700 that may be implemented within a computing device according to various aspects. At the start of an animation 202 (e.g., a rapid list scroll animation), the computing device may start a timer associated with the animation in block 204. In block 206, the computing device may calculate a move amount of objects or items (e.g., list items) as a function of the current time, and determine the objects or items to be rendered in the next frame based on this calculation in block 208. In block 210, the computing device initiates the rendering of the determined objects or items, such as by requesting rendering by a rendering engine. In block 702, the computing device may determine or note the current frame rate being achieved in the rendering process. The determination of the achieved current frame rate may be calculated based upon a number of frames that have been rendered within a predefined preceding time interval (e.g., the preceding tenth of a second), based upon an instantaneous value (e.g., a rendering duration of the last frame), a running average value, or a statistically determined value.

In determination block 704, the computing device may determine whether the current frame rate determined at block 702 is less than a minimum threshold value. If the frame rate is equal to or greater than the minimum rate (i.e., determination block 704="No"), the computing device may determine whether the animation has completed in determination block 212. If the animation has not completed (i.e., determination block 212="No"), the animation may continue by the computing device returning to block 206 to calculate the next move amount. Once the animation has completed (i.e., determination block 212="Yes"), the animation concludes in block 214.

If during the animation the computing device determines that the currently achieved frame rate is less than the minimum threshold (i.e., determination block 704="Yes"), the computing device may store the current animation speed or move amount calculated at block 206 in memory in block 706. In block 708, the computing device may calculate the amount of movement of images or items in the next frame as a function of current time in a manner similar to that described above with reference to block 206 in FIG. 2. In optional block 710, the computing device may determine the next images or items to be rendered in the next frame in a manner similar to that described above with reference to block 208. This determination is optional because some placeholder items may not involve rendering of data obtained from the scrolling document (e.g., when they are standard graphic placeholders), in which case there is no need to identify items for rendering. In block 712, the computing device may render the placeholder items (e.g., by requesting a rendering engine to accomplish the rendering). In determination block 714, the computing device may determine whether the current animation speed calculated in block 708 is less than or equal to the stored speed value (i.e., the speed value stored in block 706). If the current speed is greater than the stored speed value (i.e., determination block 714="No"), the computing device may return to block 708 to calculate the next move amount as a function of the current time and continue with the animation.

When the computing device determines that the current animation speed is equal to or less than the stored speed value (i.e., determination block 714="Yes"), the computing device may return to determination block 212 to determine whether the animation is completed. If the animation is not completed, the computing device may continue with the animation rendering normal items by returning to block 206 as described above.

Figure 8A:
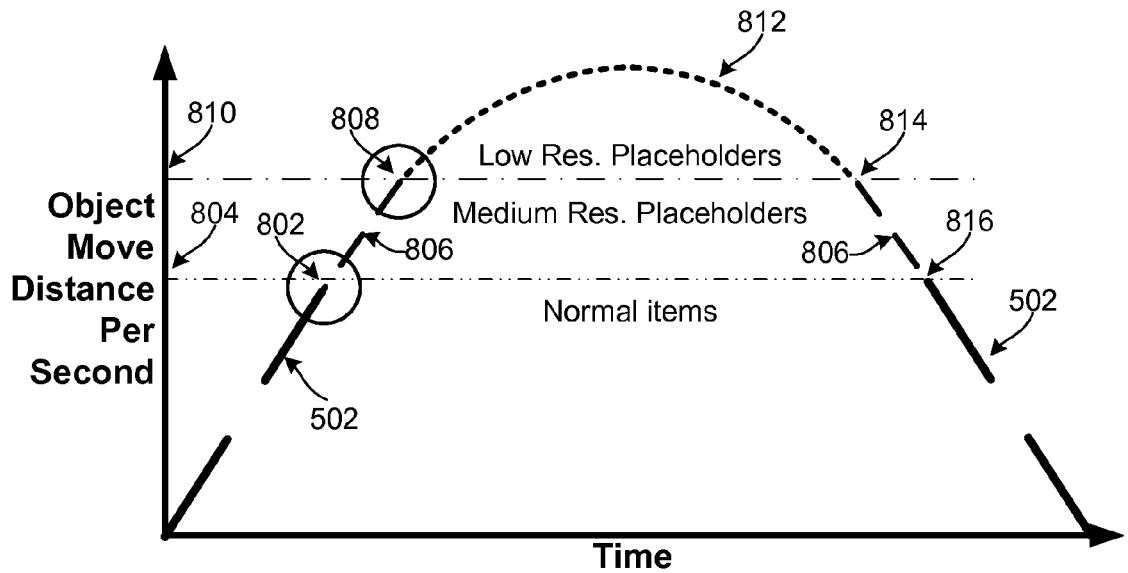
FIGS. 8A and 8B are graphs illustrating alternative aspects that implement more than one type of less computationally complex item.

In a further aspect, more than one type of placeholder item may be implemented to enable the computing device to maintain a minimum frame rate along with acceptable graphical presentations through a range of animation speeds. For example, as illustrated in FIG. 8A, an application may be configured with two placeholder items, namely a medium resolution placeholder (or placeholder format) and a low resolution placeholder (or placeholder format). In this illustrated example, normal items may be rendered (as indicated by line 502) until the achieved frame rate falls below the minimum, as indicated at point 802. When this condition is encountered, the computing device processor stores the current animation speed 804 and begins rendering medium resolution placeholder items as indicated by line 806. The rendering of medium resolution placeholder items 806 continues until the processor determines that the achieved frame rate is again below the minimum, as indicated at point 808. When this condition of the frame rate falling below the minimum a second time is detected, the computing device stores the current animation speed 810 in memory and begins rendering low-resolution placeholder items 812. The rendering of low-resolution placeholder items 812 continues until the animation speed falls below the stored value 810, after which the computing device begins rendering medium resolution placeholder items 806. The rendering of medium resolution placeholder items 806 continues until the animation is speed falls below the stored value at 804, after which the computing device begins rendering normal resolution items 502.

Figure 8B:
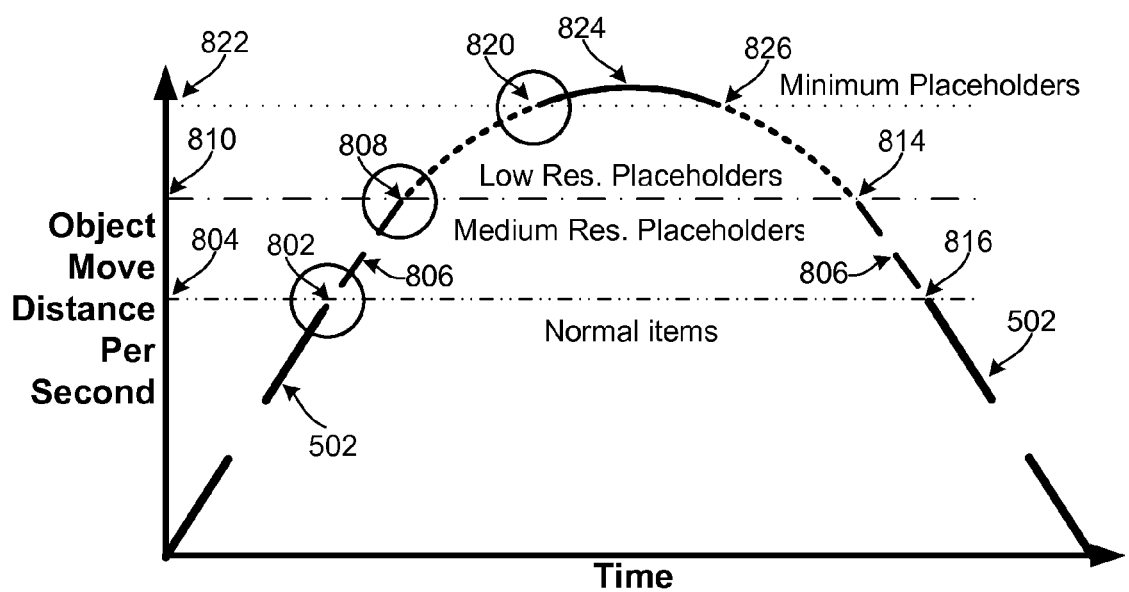

The number of different types of resolution placeholders (or placeholder formats) that may be implemented is unlimited. For example, FIG. 8B illustrates an aspect in which three different placeholders are implemented. In this example, the implementation of medium and low resolution placeholders may proceed as described above with reference to FIG. 8A. However, if the processing resources are unable to meet the minimum frame rate even rendering low-resolution items, as indicated at point 820, the computing device may maintain the minimum frame rate by rendering minimal placeholders, such as simple shading bands, simple graphics or placeholder text, as indicated by line 824. When the condition of the frame rate falling below the minimum a third time is detected, the computing device stores the current animation speed 822 in memory and begins rendering the minimum resolution placeholder items 824. The rendering of minimum-resolution placeholder items 844 continues until the animation speed falls below the stored value 822, after which the computing device begins rendering low-resolution placeholder items 812.

Figure 9:
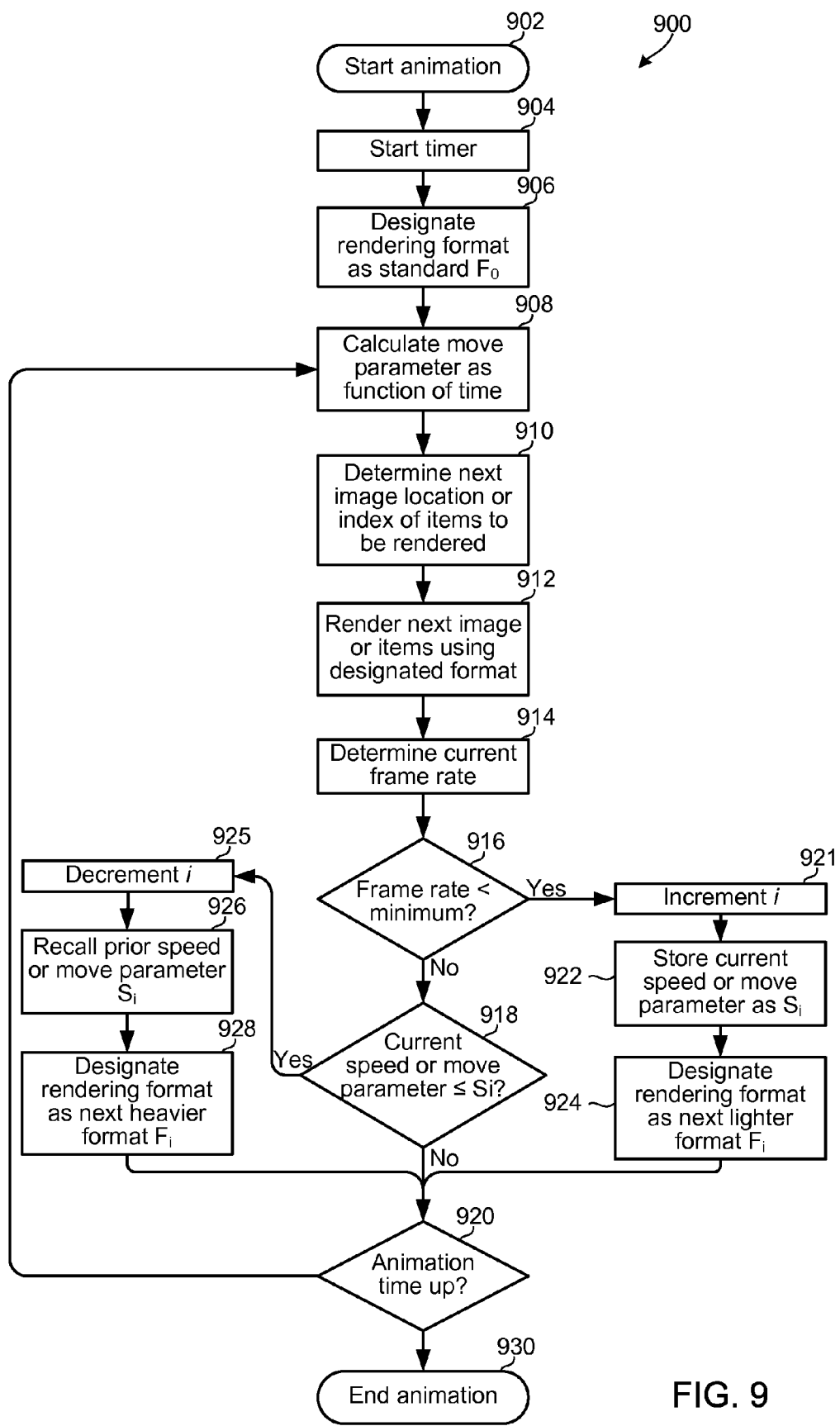
FIG. 9 is a process flow diagram of an aspect method for enabling a computing device to render images with at least a minimum frame rate using more than one type of less computationally complex item or rendering format.

FIG. 9 illustrates an example method 900 that may be implemented in a computing device according to an aspect for enabling any number of different types of placeholders (or placeholder formats) in order to maintain a minimum frame rate. In method 900 at block 902, an animation may begin, which may involve starting a timer at block 904. In block 906, the computing device may initialize the animation by designating the rendering format as normal or standard ($F_0$), and initializing an index i (i.e., set i=0) when an index is used to keep track of the speed criteria and rendering format. This operation indicates that at the beginning of the animation that normal objects or items should be rendered, or that items should be rendered in the normal format. In block 908, the computing device may calculate the move parameter or speed of the animation as a function of the current time. In block 910, the computing device may determine the next image location or items to be rendered, and request the rendering of those images or items using the currently designated format in block 912. The currently designated format ($F_i$) is the format designated in block 906, or in one of blocks 924 or 928 as describe below. In this operation, the computing device may specify to the rendering engine the objects or images to be rendered as well as the rendering format to be used. In block 914, the computing device notes or determines the current frame rate in a manner similar to that described above with reference to FIG. 7. In determination block 916, the computing device determines whether the frame rate is below the minimum threshold.

If the computing device determines that the frame rate has dropped below the minimum threshold (i.e., determination block 916="Yes"), it may increment an index i in block 921 when an index is used to keep track of the speed criteria and rendering format, store the current speed or move parameter in memory, such as in a stack or as an indexed variable (e.g., as $S_i$), and designate the rendering format as the next lighter placeholder format (e.g., $F_i$). The computing device may then determine whether the animation has completed in determination block 920. If the animation has not completed (i.e., determination block 920="No"), the computing device may continue the animation by returning to block 908 to calculate the next move parameter or distance as a function of time. In block 912, the computing device renders the next image or items using the currently designated format $F_i$ which was designated in block 924. By designating a format that requires less processing (i.e., is "lighter weight"), the computing device is able to maintain the minimum frame rate while matching the specified animation speed.

If the computing device determines that the frame rate is not less than the minimum acceptable frame rate (i.e., determination block 916="No"), it may determine whether the current animation speed or movement parameter is less than or equal to the currently stored speed S.sub.i that was stored in block 922. If the current speed is greater than the currently stored speed S.sub.i (i.e., determination block 918="No"), the computing device may determine whether the animation has completed in determination block 920. If the animation has not completed (i.e., determination block 920="No"), the computing device may continue the animation by returning the block 908 to calculate the next move parameter or distance as a function of time.

The operations in blocks 908 through 920 may continue during the animation, with ever lighter weight rendering formats $F_i$ specified in block 924 in order to maintain the desired minimum frame rate. Each time a lighter format is designated, the computing device may increment an index i (block 921), and also store the corresponding animation speed Si (block 922). For example, placeholder formats may sequentially reduce rendering complexity, such as by eliminating shadows, followed by eliminating other lighting effects, followed by reducing image details, followed by substituting cartoons for some image elements, followed by dropping some image elements, etc. Thus, any number of placeholder items (or placeholder formats) may be specified to enable the displayed images to appear to maintain consistent quality at increasing speeds while achieving the minimum frame rate to avoid the appearance of flickering.

If the computing device determines that the current speed or move parameters are less than or equal to a stored speed $S_i$ associated with the current rendering format (i.e., determination block 918="Yes"), the computing device may decrement the index i in block 925, recall the previously stored animation speed (i.e., $S_i$ after index i has been decremented) associated with the preceding rendering format in block 926, and in block 928 designate as the rendering format the next heavier rendering format (i.e., $F_i$ after index i has been decremented). The computing device may then determine whether the animation has completed in determination block 920. If the animation has not completed (i.e., determination block 920="No"), the computing device may continue the animation by returning to block 908 to calculate the next move parameter or distance as a function of time. In block 912, the computing device renders the next image or items using the currently designated format Fi which was designated in block 924. By designating a rendering format that requires more processing, the computing device is able to generate a higher resolution or more normal appearing image while maintaining the minimum frame rate at the specified animation speed.

The operations in blocks 916, 922, and 924 enable sequentially implementing rendering formats of ever lighter weight in response to increasing animation demands in order to maintain the minimum frame rate, while the operations in blocks 918, 926, and 928 enable sequentially undoing this process to implement rendering formats of increasing weight as the animation demands decrease. Thus, method 900 enables the computing device to adjust the placeholders or rendering formats consistent with application developer specifications in order to maintain the minimum desired frame rate.

While the foregoing examples have referred to a list application and a rapid list scroll animation, the aspects and the claims are not limited to such applications and may be implemented with any animation routine. The general method described above with reference to FIG. 9 may be implemented in any computing device rendering rapidly moving images and document items, including, for example, a rapid scroll or pan of a webpage, a rapid scroll of a text document, a rapid scroll or pan of a portable document format (PDF) document, a rapid scroll of a PowerPoint presentation, and a rapid scroll or pan of photographic images (e.g., JPEG and/or TIFF format images). Such image movements may be in response to user inputs (e.g., in a GUI implementation) as described above, but may also be part of the normal functioning of an application, such as a game application running on the computing device.

Figure 10:
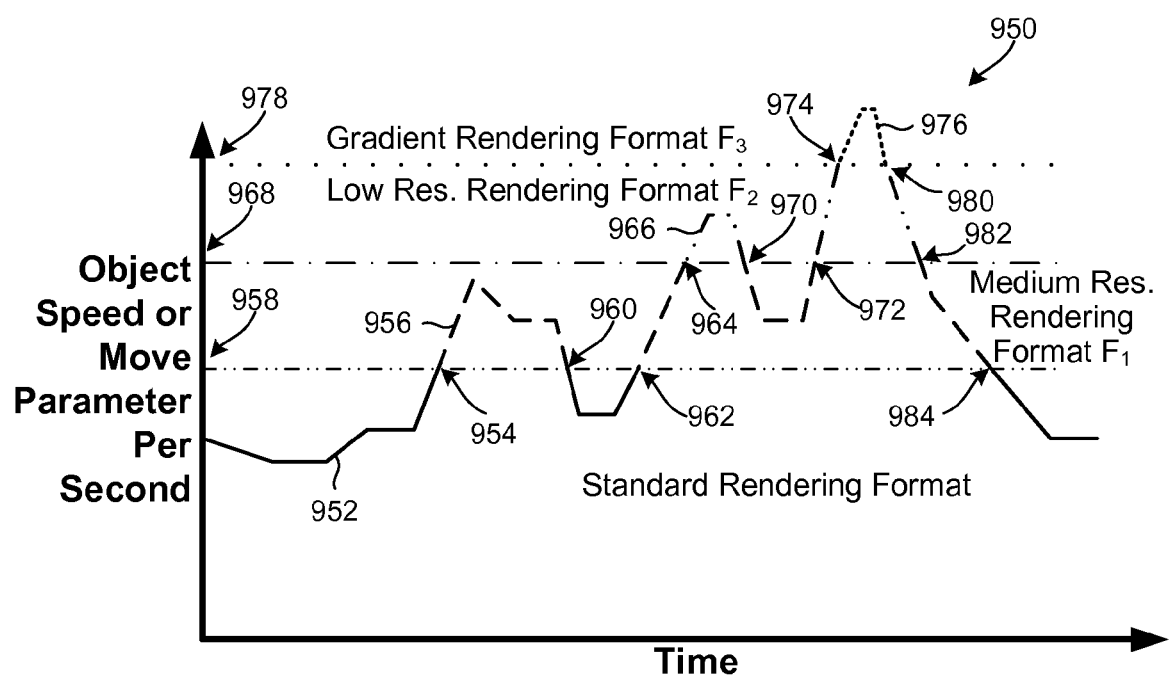
FIG. 10 is a graph illustrating how the various aspects may be implemented in any application generating moving graphics.

Further, the animations need not follow parabolic or symmetric time profiles as illustrated in FIGS. 5A-5C, 8A, and 8B. The various aspects implementing methods similar to method 900 illustrated in FIG. 9 may be implemented for animations which vary in terms of processing demands in an inconsistent manner, such as illustrated in FIG. 10. For example, the various aspects may be implemented in a computer game or in computing devices running game applications.

FIG. 10 is a graph illustrating how a computing device implementing an aspect method similar to that illustrated in FIG. 9, can adjust the rendering format in response to object speed or move parameters as a function of time for an application which exhibits randomly varying object speeds. So long as the computing device is able to render the objects or images at the minimum frame rate, rendering may be accomplished using a standard or normal rendering format, as indicated by line 952. Once the demands of the animation and/or background processes result in the achieved frame rate falling below the minimum value, indicated at point 954, the computing device may store the current object speed or move parameter as a first speed value $S_1$ (value 958), and begin rendering objects and images at a first (e.g., medium resolution) rendering format $F_1$, as indicated by line 956. When the demands of the current object speed or move parameters fall below the stored value 958, as indicated at point 960, the computing device may return to rendering objects and images using the standard or normal rendering format. When the demands of animation and/or background processes result in the achieved frame rate falling below the minimum value again, indicated at point 962, the computing device may again store that object speed or move parameter value $S_1$ (958), and return to rendering objects and images using the first rendering format $F_1$. When the demands of the animation and/or background processes result in the achieved frame rate falling below the minimum value again, indicated at point 964, the computing device may store that object speed or move parameter value $S_2$ (968), and begin rendering objects and images using a second (e.g., low resolution) rendering format $F_2$. When the demands of the current object speed or move parameters fall below the stored value $S_2$ (968), as indicated at 970, the computing device may return to rendering objects and images using the next heavier first rendering format $F_1$. When the demands of animation and/or background processes result in the achieved frame rate again falling below the minimum value again, indicated at point 972, the computing device may again store that object speed or move parameter value $S_2$ (968), and return to rendering objects and images using the second rendering format $F_2$. When the demands of animation and/or background processes result in the achieved frame rate falling below the minimum value again, indicated at point 964, the computing device may store that object speed or move parameter value $S_2$ (968), and begin rendering objects and images using the second rendering format $F_2$. When the demands of animation and/or background processes result in the achieved frame rate falling below the minimum value again, indicated at point 974, the computing device may store that object speed or move parameter value $S_3$ (978), and begin rendering objects and images using a third (e.g., gradient) rendering format $F_3$. When the demands of the animation fall below the stored speed values $S_3$, $S_2$, and $S_1$, indicated at points 980, 982, and 984 respectively, the computing device may revert to the second rendering format $F_2$, first rendering format $F_1$, and standard or normal rendering format, accordingly.

It should be appreciated that variations in the achieved frame rate may be due in part to background processes which reduce the amount of processing resources available for rendering objects and items, as well as the processing demands of the graphic animation. Such background processes may be very difficult for application developers to anticipate. Thus, the aspects enable a computing device to continue to deliver consistent frame rate performance for an animation even when a background process limits the computing device image rendering capabilities. By keeping track of only the animation speed or move parameters that were implemented at the time that a placeholder for rendering process was implemented, the various aspects provide a simple mechanism for accommodating variations in animation and background processing demands without the need to monitor or predict background processes. Since the animation speed or move parameter associated with a given placeholder implementation may be reset each time the placeholder rendering is reset (e.g., returning to normal rendering or the next heaviest rendering), the aspects can accommodate dynamic changes in background processes without reducing the image rendering unnecessarily or requiring complex algorithms or device-specific implementations.

In a further aspect, the computing device may be configured to select a placeholder or rendering format that will enable a near optimum rendering of the animation graphics while supporting the minimum frame rate. In this aspect, the computing device may make a guess or estimate of a rendering format that will enable it to satisfy the frame rate minimum with minimal reduction in image quality. Such a guess or estimation may be based upon the current speed or processing demands of the animation, the current frame rate performance and/or background process demands. Once the guessed or estimated rendering format is implemented, the computing device may monitor the achieved frame rate to determine whether it is above or below the minimum frame rate. If the achieved frame rate is still below the minimum threshold, the computing device may implement a lighter rendering format (i.e., a rendering format that requires less processing), and continue to monitor the achieved frame rate. If the achieved frame rate is above the minimum, such as by a threshold amount, the computing device may implement a heavier rendering format (i.e., a rendering format that requires more processing), and continue to monitor the achieved frame rate. In this manner, the computing device can continuously adjust the rendering format consistent with the minimum frame rate to achieve near optimum rendering. In this aspect, application developers need only specify the minimum desired frame rate and identify or characterize the various placeholders or rendering formats.

As mentioned above, the foregoing example applications of the aspects to lists of text and image objects are provided for example purposes only. The aspects may also be applied to any displayed content or images which are scrolled or panned on a display, such as scrolling or panning of webpage text and images, word processing documents, portable document format (PDF) documents, PowerPoint presentations, text documents, photographic images (e.g., JPEG and/or TIFF images), etc.

Figure 11A:
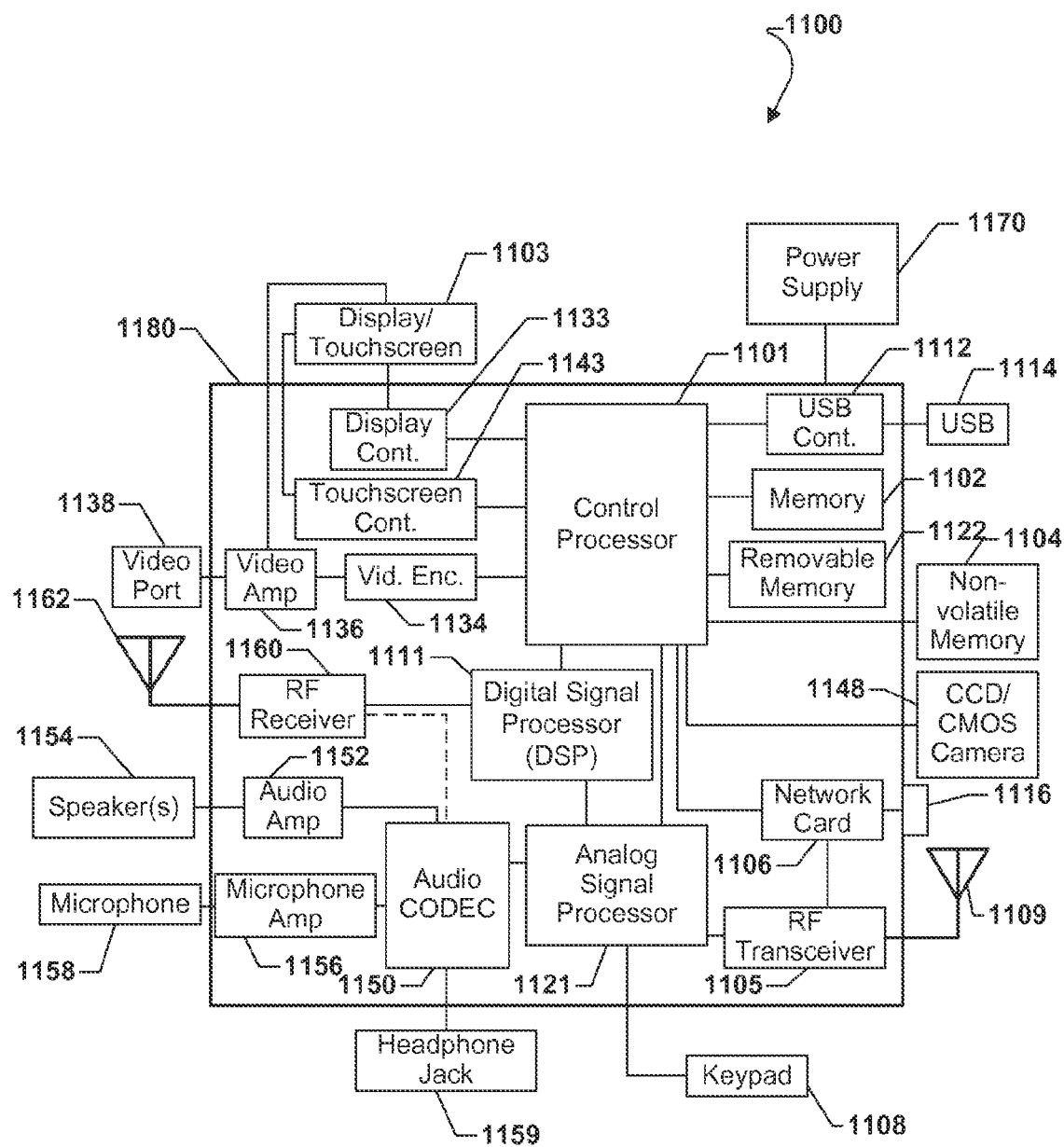
FIGS. 11A and 11B are component block diagrams of an example portable computing device suitable for use with the various aspects.
Figure 11B:
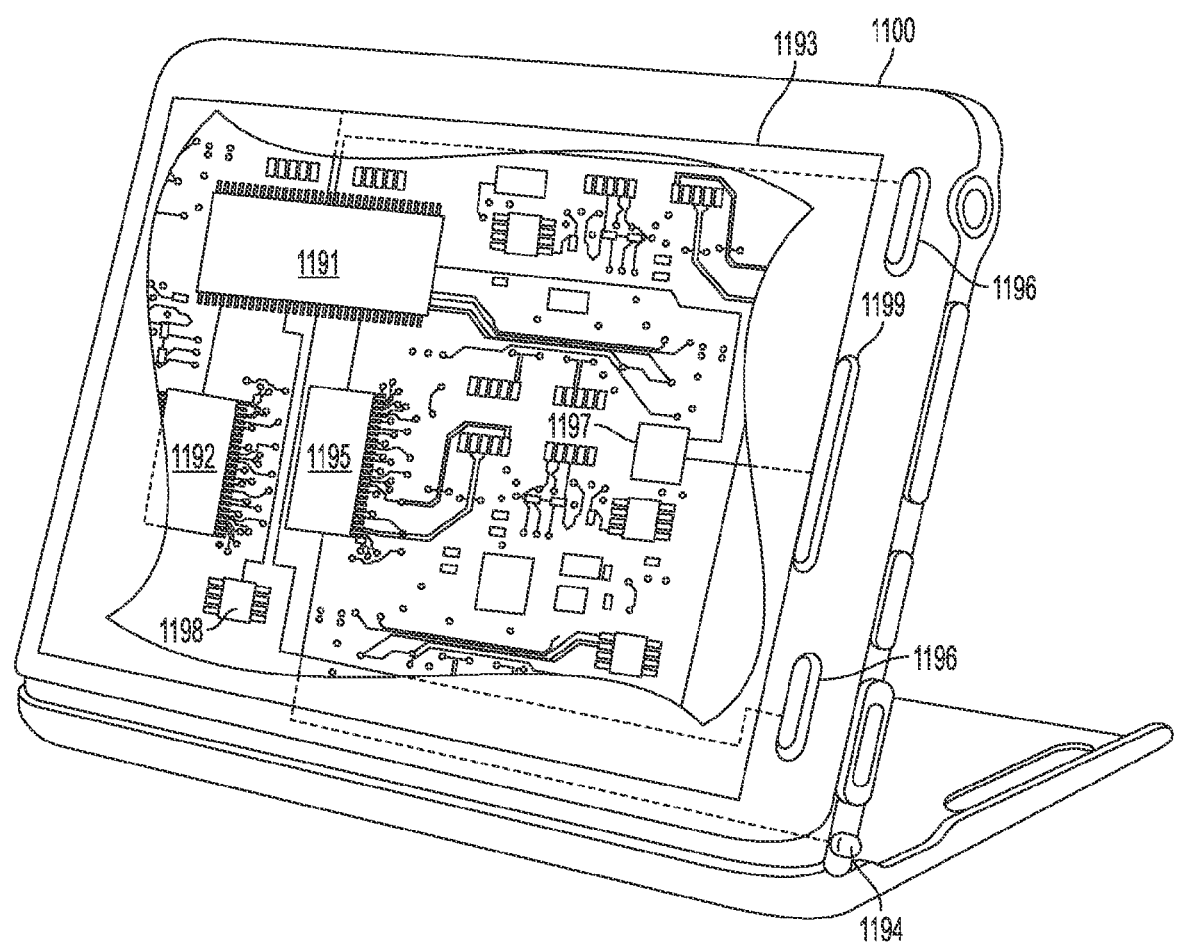
Figure 12:
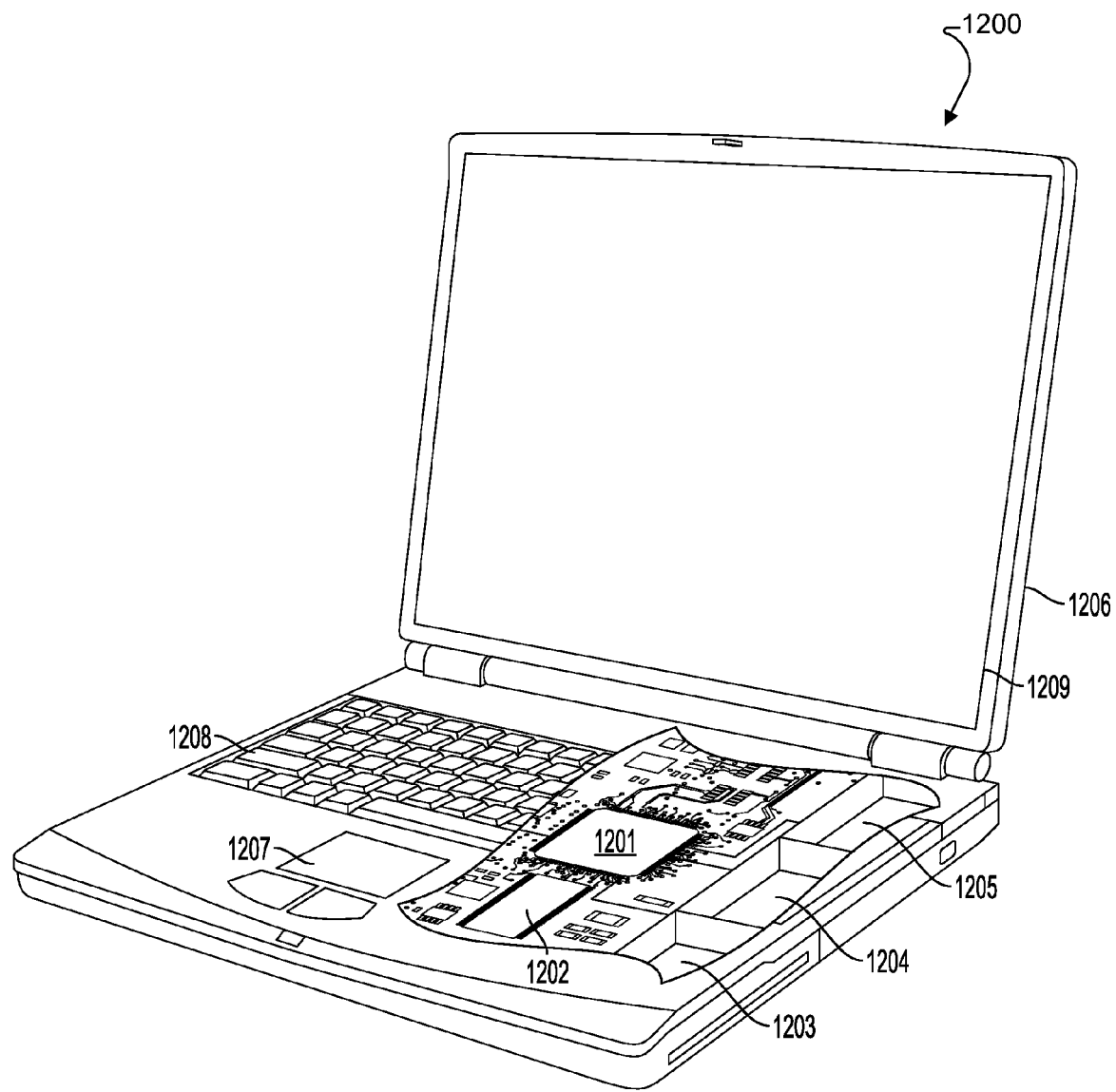
FIG. 12 is a complement block diagram of an example personal computer suitable for use with the various aspects.

The aspects described above may be implemented on any of a variety of computing devices, such as mobile devices 1100 as illustrated in FIGS. 11A and 11B, and notebook computers 1200 as illustrated in FIG. 12. Typical mobile devices 1100 will have in common some of the components illustrated in FIGS. 11A and 11B. For example, the computing devices 1100, 1200 may include a processor 1101, 1191, 1201 coupled to internal memory 1102, 1104, 1192, 1202, 1203 and a touch surface input device or display 1103, 1193, 1209. The touch surface input device 1103, 1193, 1209 can be any type of touchscreen display 1103, 1193, 1209, such as a resistive-sensing touchscreen, capacitive-sensing touchscreen, infrared sensing touchscreen, acoustic/piezoelectric sensing touchscreen, or the like. The various aspects are not limited to any particular type of touchscreen display or touchpad technology. Additionally, the computing device 1100 may have an antenna 1109, 1162, 1194 for sending and receiving electromagnetic radiation that is connected to a wireless data link and/or cellular telephone transceiver 1105, 1195 coupled to the processor 1101, 1191, 1201. Computing devices 1100 which do not include a touchscreen input device 1103, 1193, 1209 (and thus typically do not have a display 1103, 1193, 1209) usually do include a key pad 1108, 1208 or miniature keyboard, and menu selection keys or rocker switches 1196, 1207, which serve as pointing devices. The processor 1101, 1191, 1201 may further be connected to a wired network interface 1206, 1198, such as a universal serial bus (USB) 1112, 1114 or FireWire® connector socket, for connecting the processor 1101, 1191 to an external touchpad or touch surface on which the various aspects may also be applied.

In some implementations, a touch surface can be provided in areas of the electronic device 1100 outside of the touchscreen display 1103, 1193, 1209 or display 1103, 1193, 1209. For example, the keypad 1108, 1208 can include a touch surface with buried capacitive touch sensors. In other implementations, the keypad 1108, 1208 may be eliminated so the touchscreen display 1103, 1193, 1209 provides the complete GUI. In yet further implementations, a touch surface may be an external touchpad that can be connected to the computing device 1100, 1200 by means of a cable to a cable connector 1198, 1198, 1206, or by a wireless transceiver (e.g., transceiver 1105, 1195) coupled to the processor 1101, 1191, 1201.

Numerous embodiments of the mobile device 1100 may include the following elements in varying combinations: a digital signal processor (DSP) 1111, a USB controller 1112, a wired network interface connector 1116, an analog signal processor 1121, a removable memory 1122, a display controller 1133, a video encoder 1134, a video amplifier 1136, a video port 1138, a touchscreen controller 1143, a charge-coupled device (CCD) or complementary metal-oxide-semiconductor (CMOS) camera 1148, an audio codec 1150, an audio amplifier 1152, speakers 1154, 1196, a microphone amplifier 1156, a microphone 1158, a headphone jack 1159, an RF receiver 1160, a power supply 1170, and a housing 1180, 1193.

The aspects described above may also be implemented within a variety of computing devices, such as a laptop computer 1200 as illustrated in FIG. 12. Many laptop computers include a touch pad touch surface that serves as the computer's pointing device, and thus may receive drag, scroll, and flick gestures similar to those implemented on mobile devices equipped with a touchscreen display. A laptop computer 1200 will typically include a processor 1201 coupled to volatile memory 1202 and a large capacity nonvolatile memory, such as a disk drive 1203. The computer 1200 may also include a floppy disc drive 1204 and a compact disc (CD) drive 1205 coupled to the processor 1201. The computer device 1200 may also include a number of connector ports coupled to the processor 1201 for establishing data connections or receiving external memory devices, such as a USB or FireWire® connector sockets, or other network connection circuits 1206 for coupling the processor 1201 to a network. In a notebook configuration, the computer housing includes the touchpad 1207, keyboard 1208, and the display 1209 all coupled to the processor 1201. Other configurations of computing device may include a computer mouse or trackball coupled to the processor (e.g., via a USB input) as are well known.

The computing device processor 1101, 1191, 1201 may be any programmable microprocessor, microcomputer or multiple processor chip or chips that can be configured by software instructions (applications) to perform a variety of functions, including the functions of the various aspects described above. In some portable computing devices 1100, 1200, multiple processors 1101, 1191, 1201 may be provided, such as one processor dedicated to wireless communication functions and one processor dedicated to running other applications. The processor may also be included as part of a communication chipset.

The foregoing method descriptions and the process flow diagrams are provided merely as illustrative examples, and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such a non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of, non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for implementing a display animation on a computing device, comprising:
    monitoring a rate of frames rendered during the display animation;
    determining a speed of animation, wherein the speed of animation represents a rate at which an object displayed in the animation moves;
    rendering less computationally complex items when the monitored frame rate is determined to be below a minimum acceptable value, wherein the less computationally complex items are standard graphic items comprising fixed image elements that are representative of normal items, are recalled from a memory of the computing device, and can be rendered faster than normal items, wherein the fixed image elements are the same for each of the less computationally complex items;
    storing a first speed of the animation, wherein the first speed of animation is the speed of animation that is determined when the monitored frame rate is determined to be below the minimum acceptable value; and
    rendering normal items when the determined speed of the animation falls below the stored speed.

2. The method of claim 1, wherein the monitored frame rate is based upon a number of frames rendered during a predefined preceding interval.

3. The method of claim 1, wherein the monitored frame rate is based upon a running average frame rate.

4. The method of claim 1, wherein the less computationally complex items are defined as part of an application.

5. The method of claim 1, wherein the display animation is one of a rapid list scroll animation, a rapid scroll or pan of a webpage, a rapid scroll of a text document, a rapid scroll or pan of a portable document format (PDF) document, a rapid scroll of a slide presentation, and a rapid scroll or pan of photographic images.

6. A method for implementing a display animation on a computing device, comprising:
    designating a first rendering format for rendering images at an initiation of the display animation;
    rendering images using the designated first rendering format;
    monitoring a rate of frames rendered during the display animation;
    determining when the monitored frame rate falls below a minimum acceptable value;
    designating a second rendering format for rendering images when it is determined that the monitored frame rate falls below the minimum acceptable value, wherein the second rendering format requires less processing than the first rendering format by using standard graphic items comprising fixed image elements that are representative of normal items and are recalled from a memory of the computing device, wherein the fixed image elements are the same for each of the less computationally complex items;
    determining a speed of the animation, wherein the speed of animation represents a rate at which an object displayed in the animation moves;
    storing a first speed of the animation, wherein the first speed of animation is the speed of animation that is determined when it is determined that the monitored frame rate is determined to be below the minimum acceptable value;
    determining when the determined speed of the animation is less than the stored first speed; and
    designating the first rendering format when the current designated rendering format is the second rendering format and it is determined that the determined speed of the animation is less than the stored first speed.

7. The method of claim 6, further comprising:
    designating a third rendering format for rendering images and storing a second speed of the animation, wherein the second speed of animation is the speed of animation that is determined when the currently designated rendering format is the second format and it is determined that the monitored frame rate falls below the minimum acceptable value;
    determining when the determined speed of the animation is less than the stored second speed; and
    designating the second rendering format when the current designated rendering format is the third rendering format and it is determined that the determined speed of the animation is less than the stored second speed.

8. The method of claim 7, further comprising:
    designating a fourth rendering format for rendering images and storing a third speed of the animation, wherein the third speed of animation is the speed of animation that is determined when the currently designated rendering format is the third format and it is determined that the monitored frame rate falls below the minimum acceptable value;

determining when the determined speed of the animation is less than the stored third speed; and designating the third rendering format when the current designated rendering format is the fourth rendering format and it is determined that the determined speed of the animation is less than the stored third speed.

9. The method of claim 8, wherein the first, second and third rendering formats are defined as part of an application.

10. The method of claim 6, wherein the monitored frame rate is based upon a number of frames rendered during a predefined preceding interval.

11. The method of claim 6, wherein the monitored frame rate is based upon a running average frame rate.

12. The method of claim 6, wherein the display animation is a rapid list scroll animation.

13. The method of claim 6, wherein the display animation is generated by a game application.

14. A computing device, comprising:
a processor;
a display coupled to the processor; and
a memory coupled to the processor,
wherein the processor is configured with processor-executable instructions to perform operations comprising:
monitoring a rate of frames rendered during the display animation;
determining a speed of animation, wherein the speed of animation represents a rate at which an object displayed in the animation moves;
rendering less computationally complex items when the monitored frame rate is determined to be below a minimum acceptable value, wherein the less computationally complex items are standard graphic items comprising fixed image elements that are representative of normal items, are recalled from the memory of the computing device, and can be rendered faster than normal items, wherein the fixed image elements are the same for each of the less computationally complex items;
storing a first speed of the animation, wherein the first speed of animation is the speed of animation that is determined when the monitored frame rate is determined to be below the minimum acceptable value; and
rendering normal items when the determined speed of the animation falls below the stored speed.

15. The computing device of claim 14, wherein the processor is configured with processor-executable instructions to perform operations such that the monitored frame rate is based upon a number of frames rendered during a predefined preceding interval.

16. The computing device of claim 14, wherein the processor is configured with processor-executable instructions to perform operations such that the monitored frame rate is based upon a running average frame rate.

17. The computing device of claim 14, wherein the processor is configured with processor-executable instructions to perform operations such that the less computationally complex items are defined as part of an application.

18. The computing device of claim 14, wherein the processor is configured with processor-executable instructions to perform operations such that the display animation is one of a rapid list scroll animation, a rapid scroll or pan of a webpage, a rapid scroll of a text document, a rapid scroll or pan of a portable document format (PDF) document, a rapid scroll of a slide presentation, and a rapid scroll or pan of photographic images.

19. A computing device, comprising:
a processor;
a display coupled to the processor; and
a memory coupled to the processor,
wherein the processor is configured with processor-executable instructions to perform operations comprising:
designating a first rendering format for rendering images at an initiation of the display animation;
rendering images using the designated rendering format;
monitoring a rate of frames rendered during the display animation;
determining when the monitored frame rate falls below a minimum acceptable value;
designating a second rendering format for rendering images when it is determined that the monitored frame rate falls below the minimum acceptable value, wherein the second rendering format requires less processing than the first rendering format by using standard graphic items comprising fixed image elements that are representative of normal items and are recalled from the memory of the computing device, wherein the fixed image elements are the same for each of the less computationally complex items;
determining a speed of the animation, wherein the speed of animation represents a rate at which an object displayed in the animation moves;
storing a first speed of the animation, wherein the first speed of animation is the speed of animation that is determined when it is determined that the monitored frame rate is determined to be below the minimum acceptable value;
determining when the determined speed of the animation is less than the stored first speed; and
designating the first rendering format when the current designated rendering format is the second rendering format and it is determined that the determined speed of the animation is less than the stored first speed.

20. The computing device of claim 19, wherein the processor is configured with processor-executable instructions to perform operations further comprising:
designating a third rendering format for rendering images and storing a second speed of the animation, wherein the second speed of animation is the speed of animation that is determined when the currently designated rendering format is the second format and it is determined that the monitored frame rate falls below the minimum acceptable value;
determining when the determined speed of the animation is less than the stored second speed; and
designating the second rendering format when the current designated rendering format is the third rendering format and it is determined that the determined speed of the animation is less than the stored second speed.

21. The computing device of claim 20, wherein the processor is configured with processor-executable instructions to perform operations further comprising:
designating a fourth rendering format for rendering images and storing a third speed of the animation, wherein the third speed of animation is the speed of animation that is determined when the currently designated rendering format is the third format and it is determined that the monitored frame rate falls below the minimum acceptable value;

determining when the determined speed of the animation is less than the stored third speed; and designating the third rendering format when the current designated rendering format is the fourth rendering format and it is determined that the determined speed of the animation is less than the stored third speed.

22. The computing device of claim 21, wherein the processor is configured with processor-executable instructions to perform operations such that the first, second and third rendering formats are defined as part of an application.

23. The computing device of claim 19, wherein the processor is configured with processor-executable instructions to perform operations such that the monitored frame rate is based upon a number of frames rendered during a predefined preceding interval.

24. The computing device of claim 19, wherein the processor is configured with processor-executable instructions to perform operations such that the monitored frame rate is based upon a running average frame rate.

25. The computing device of claim 19, wherein the processor is configured with processor-executable instructions to perform operations such that the display animation is one of a rapid list scroll animation, a rapid scroll or pan of a webpage, a rapid scroll of a text document, a rapid scroll or pan of a portable document format (PDF) document, a rapid scroll of a slide presentation, and a rapid scroll or pan of photographic images.

26. The computing device of claim 19, wherein the processor is configured with processor-executable instructions to perform operations such that the display animation is generated by a game application.

27. A computing device, comprising:
means for monitoring a rate of frames rendered during the display animation;
means for determining a speed of animation, wherein the speed of animation represents a rate at which an object displayed in the animation moves;
means for rendering less computationally complex items when the monitored frame rate is determined to be below a minimum acceptable value, wherein the less computationally complex items are standard graphic items comprising fixed image elements that are representative of normal items, are recalled from a memory of the computing device, and can be rendered faster than normal items, wherein the fixed image elements are the same for each of the less computationally complex items;
means for storing a first speed of the animation, wherein the first speed of animation is the speed of animation that is determined when the monitored frame rate is determined to be below the minimum acceptable value; and
means for rendering normal items when the determined speed of the animation falls below the stored speed.

28. The computing device of claim 27, wherein means for monitoring a rate of frames rendered comprises means for monitoring the rate of frames rendered based upon a number of frames rendered during a predefined preceding interval.

29. The computing device of claim 27, wherein means for monitoring a rate of frames rendered comprises means for monitoring the rate of frames rendered based upon a running average frame rate.

30. The computing device of claim 27, wherein the less computationally complex items are defined as part of an application.

31. The computing device of claim 27, wherein the display animation is one of a rapid list scroll animation, a rapid scroll or pan of a webpage, a rapid scroll of a text document, a rapid scroll or pan of a portable document format (PDF) document, a rapid scroll of a slide presentation, and a rapid scroll or pan of photographic images.

32. A computing device, comprising:
means for designating a first rendering format for rendering images at an initiation of the display animation;
means for rendering images using the designated rendering format;
means for monitoring a rate of frames rendered during the display animation;
means for determining when the monitored frame rate falls below a minimum acceptable value;
means for designating a second rendering format for rendering images when it is determined that the monitored frame rate falls below the minimum acceptable value, wherein the second rendering format requires less processing than the first rendering format by using standard graphic items comprising fixed image elements that are representative of normal items and are recalled from a memory of the computing device, wherein the fixed image elements are the same for each of the less computationally complex items;
means for determining a speed of the animation, wherein the speed of animation represents a rate at which an object displayed in the animation moves;
means for storing a first speed of the animation, wherein the first speed of animation is the speed of animation that is determined when it is determined that the monitored frame rate is determined to be below the minimum acceptable value;
means for determining when the determined speed of the animation is less than the stored first speed; and
means for designating the first rendering format when the current designated rendering format is the second rendering format and it is determined that the determined speed of the animation is less than the stored first speed.

33. The computing device of claim 32, further comprising:
means for designating a third rendering format for rendering images and storing a second speed of the animation when, wherein the second speed of animation is the speed of animation that is determined the currently designated rendering format is the second format and it is determined that the monitored frame rate falls below the minimum acceptable value;
means for determining when the determined speed of the animation is less than the stored second speed; and
means for designating the second rendering format when the current designated rendering format is the third rendering format and it is determined that the determined speed of the animation is less than the stored second speed.

34. The computing device of claim 33, further comprising:
means for designating a fourth rendering format for rendering images and storing a third speed of the animation, wherein the third speed of animation is the speed of animation that is determined when the currently designated rendering format is the third format and it is determined that the monitored frame rate falls below the minimum acceptable value;
means for determining when the determined speed of the animation is less than the stored third speed; and
means for designating the third rendering format when the current designated rendering format is the fourth rendering format and it is determined that the determined speed of the animation is less than the stored third speed.

35. The computing device of claim 34, wherein the first, second and third rendering formats are defined as part of an application.

36. The computing device of claim 33, wherein means for monitoring a rate of frames rendered comprises means for monitoring the rate of frames rendered based upon a number of frames rendered during a predefined preceding interval.

37. The computing device of claim 33, wherein means for monitoring a rate of frames rendered comprises means for monitoring the rate of frames rendered based upon a running average frame rate.

38. The computing device of claim 33, wherein the display animation is one of a rapid list scroll animation, a rapid scroll or pan of a webpage, a rapid scroll of a text document, a rapid scroll or pan of a portable document format (PDF) document, a rapid scroll of a slide presentation, and a rapid scroll or pan of photographic images.

39. The computing device of claim 33, wherein the display animation is generated by a game application.

40. A non-transitory processor-readable storage medium having stored thereon processor-executable instructions configured to cause a processor of a computing device to perform operations comprising:
   monitoring a rate of frames rendered during the display animation;
   determining a speed of the animation, wherein the speed of animation represents a rate at which an object displayed in the animation moves;
   rendering less computationally complex items when the monitored frame rate is determined to be below a minimum acceptable value, wherein the less computationally complex items are standard graphic items comprising fixed image elements that are representative of normal items, are recalled from a memory of the computing device, and can be rendered faster than normal items, wherein the fixed image elements are the same for each of the less computationally complex items;
   storing a first speed of the animation, wherein the first speed of animation is the speed of animation that is determined when the monitored frame rate is determined to be below the minimum acceptable value; and
   rendering normal items when the determined speed of the animation falls below the stored speed.

41. The non-transitory processor-readable storage medium of claim 40, wherein the stored instructions are configured to cause a processor of a computing device to perform operations such that the monitored frame rate is based upon a number of frames rendered during a predefined preceding interval.

42. The non-transitory processor-readable storage medium of claim 40, wherein the stored instructions are configured to cause a processor of a computing device to perform operations such that the monitored frame rate is based upon a running average frame rate.

43. The non-transitory processor-readable storage medium of claim 40, wherein the stored instructions are configured to cause a processor of a computing device to perform operations such that the less computationally complex items are defined as part of an application.

44. The non-transitory processor-readable storage medium of claim 40, wherein the stored instructions are configured to cause a processor of a computing device to perform operations such that the display animation is one of a rapid list scroll animation, a rapid scroll or pan of a webpage, a rapid scroll of a text document, a rapid scroll or pan of a portable document format (PDF) document, a rapid scroll of a slide presentation, and a rapid scroll or pan of photographic images.

45. A non-transitory processor-readable storage medium having stored thereon processor-executable instructions configured to cause a processor of a computing device to perform operations comprising:
   designating a first rendering format for rendering images at an initiation of the display animation;
   rendering images using the designated rendering format;
   monitoring a rate of frames rendered during the display animation;
   determining when the monitored frame rate falls below a minimum acceptable value;
   designating a second rendering format for rendering images when it is determined that the monitored frame rate falls below the minimum acceptable value, wherein the second rendering format requires less processing than the first rendering format by using standard graphic items comprising fixed image elements that are representative of normal items and are recalled from a memory of the computing device, wherein the fixed image elements are the same for each of the less computationally complex items;
   determining a speed of the animation, wherein the speed of animation represents a rate at which an object displayed in the animation moves;
   storing a first speed of the animation, wherein the first speed of animation is the speed of animation that is determined when it is determined that the monitored frame rate is determined to be below the minimum acceptable value;
   determining when the determined speed of the animation is less than the stored first speed; and
   designating the first rendering format when the current designated rendering format is the second rendering format and it is determined that the determined speed of the animation is less than the stored first speed.

46. The non-transitory processor-readable storage medium of claim 45, wherein the stored instructions are configured to cause a processor of a computing device to perform operations further comprising:
   designating a third rendering format for rendering images and storing a second speed of the animation, wherein the second speed of animation is the speed of animation that is determined when the currently designated rendering format is the second format and it is determined that the monitored frame rate falls below the minimum acceptable value;
   determining when the determined speed of the animation is less than the stored second speed; and
   designating the second rendering format when the current designated rendering format is the third rendering format and it is determined that the determined speed of the animation is less than the stored second speed.

47. The non-transitory processor-readable storage medium of claim 46, wherein the stored instructions are configured to cause a processor of a computing device to perform operations further comprising:
   designating a fourth rendering format for rendering images and storing a third speed of the animation, wherein the third speed of animation is the speed of animation that is determined when the currently designated rendering format is the third format and it is determined that the monitored frame rate falls below the minimum acceptable value;

determining when the determined speed of the animation is less than the stored third speed; and designating the third rendering format when the current designated rendering format is the fourth rendering format and it is determined that the determined speed of the animation is less than the stored third speed.

48. The non-transitory processor-readable storage medium of claim 47, wherein the stored instructions are configured to cause a processor of a computing device to perform operations such that the first, second and third rendering formats are defined as part of an application.

49. The non-transitory processor-readable storage medium of claim 45, wherein the stored instructions are configured to cause a processor of a computing device to perform operations such that the monitored frame rate is based upon a number of frames rendered during a predefined preceding interval.

50. The non-transitory processor-readable storage medium of claim 45, wherein the stored instructions are configured to cause a processor of a computing device to perform operations such that the monitored frame rate is based upon a running average frame rate.

51. The non-transitory processor-readable storage medium of claim 45, wherein the stored instructions are configured to cause a processor of a computing device to perform operations such that the display animation is one of a rapid list scroll animation, a rapid scroll or pan of a webpage, a rapid scroll of a text document, a rapid scroll or pan of a portable document format (PDF) document, a rapid scroll of a slide presentation, and a rapid scroll or pan of photographic images.

52. The non-transitory processor-readable storage medium of claim 45, wherein the stored instructions are configured to cause a processor of a computing device to perform operations such that the display animation is generated by a game application.

* * * * *